(12) United States Patent
Mahmoudi

(10) Patent No.: US 11,338,897 B2
(45) Date of Patent: May 24, 2022

(54) SHELTERING A BALLOON

(71) Applicant: Mohammad Mahdi Mahmoudi, Mashhad (IR)

(72) Inventor: Mohammad Mahdi Mahmoudi, Mashhad (IR)

( * ) Notice: Subject to any disclaimer, the term of this patent is extended or adjusted under 35 U.S.C. 154(b) by 112 days.

(21) Appl. No.: 16/998,901

(22) Filed: Aug. 20, 2020

(65) Prior Publication Data

US 2020/0377190 A1 Dec. 3, 2020

Related U.S. Application Data

(60) Provisional application No. 62/889,582, filed on Aug. 21, 2019.

(51) Int. Cl.
*B64B 1/66* (2006.01)
*B64B 1/42* (2006.01)
*B64B 1/50* (2006.01)

(52) U.S. Cl.
CPC .................. *B64B 1/66* (2013.01); *B64B 1/42* (2013.01); *B64B 1/50* (2013.01)

(58) Field of Classification Search
CPC .... B64B 1/66; B64B 1/42; B64B 1/50; B64B 1/14; B64B 1/00; E04H 15/02; E04H 15/54; E04H 9/14; A62C 3/0214; A62C 3/0257; B64F 1/005; B64F 1/12
See application file for complete search history.

(56) References Cited

U.S. PATENT DOCUMENTS

| 1,823,289 | A | * | 9/1931 | Powelson | B64F 1/14 244/115 |
| 7,093,790 | B1 | * | 8/2006 | Davidson | B64B 1/50 244/110 E |
| 7,686,094 | B2 | * | 3/2010 | Kleff | B32B 17/02 169/50 |
| 2020/0039662 | A1 | * | 2/2020 | Descheemaeker | B64F 1/005 |

FOREIGN PATENT DOCUMENTS

| CA | 2425527 A1 * | 10/2004 | B64F 1/005 |
| CN | 111284678 A * | 6/2020 | A62C 99/00 |
| DE | 202011051769 U1 * | 1/2013 | B64F 1/005 |
| KR | 20170003590 U * | 10/2017 | B64F 1/005 |
| WO | WO-9412391 A1 * | 6/1994 | B64F 1/005 |
| WO | WO-2005068294 A1 * | 7/2005 | B64F 1/005 |
| WO | WO-2020100138 A1 * | 5/2020 | A62C 99/00 |

\* cited by examiner

*Primary Examiner* — Joshua J Michener
*Assistant Examiner* — Ryan Andrew Yankey
(74) *Attorney, Agent, or Firm* — Bajwa IP Law Firm; Haris Zaheer Bajwa

(57) ABSTRACT

A method for sheltering a balloon, a blimp, or airship. The method includes obtaining a first guideway by detachably attaching a first plurality of detachable rings to a first side of an outer surface of the balloon, placing a first rope into the first guideway by passing the first rope through the first plurality of detachable rings, attaching a first end of the first rope to a first point of a blanket, and pulling the blanket over the balloon by pulling a second end of the first rope in a first direction pulling the blanket over the balloon by pulling a second end of the first rope in a first direction.

13 Claims, 41 Drawing Sheets

1200

SHELTERING A BALLOON

CROSS-REFERENCE TO RELATED APPLICATION

This application claims the benefit of priority from U.S. Provisional Patent Application Ser. No. 62/889,582, filed on Aug. 21, 2019, and entitled "THE SHELTER OF VARIOUS TYPES OF TETHERED HELIUM BALLOONS, BLIMPS AND AIRSHIP WITH DIFFERENT SHAPES AND SIZES" which is incorporated herein by reference in its entirety.

TECHNICAL FIELD

The present disclosure generally relates to balloons, blimps, dirigibles, and airships. The present disclosure more particularly relates to a method for sheltering a balloon, a blimp, a dirigible, or an airship.

BACKGROUND

When a balloon, an airship, or a blimp is moored or tethered to the ground, high speed winds, rainy weather, and ultraviolet radiations may have negative impacts on a lifespan of the balloon, the airship, or the blimp. When a balloon is moored or tethered to the ground, a piece of blanket or a piece of shelter may be applied over a top section of the balloon envelope to protect the balloon from high speed winds, rainy weather, and ultraviolet radiations. By applying a piece of blanket or a piece of shelter over a top section of a balloon envelope, lifespan of the balloon may increase. Applying a piece of shelter or a piece of blanket over a balloon has various drawbacks including, but not limited to, being expensive and time consuming due to a big size of typical balloons. There is, therefore, a need for a non-expensive and fast method for pulling a piece of blanket or a piece of shelter over a balloon.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for sheltering a balloon. In an exemplary embodiment, the method may include obtaining a first guideway, placing a first rope into the first guideway, attaching a first end of the first rope to a first point of a blanket, and pulling the blanket over the balloon. In an exemplary embodiment, obtaining the first guideway may be done by detachably attaching a first plurality of detachable rings to a first side of an outer surface of the balloon. In an exemplary embodiment, placing the first rope into the first guideway may be done by passing the first rope through the first plurality of detachable rings.

In an exemplary embodiment, pulling the blanket over the balloon may include guiding the first point of the blanket to move along the first guideway and detaching each respective detachable ring of the first plurality of detachable rings from the first side of the outer surface of the balloon. In an exemplary embodiment, guiding the first point of the blanket to move along the first guideway may be done by pulling the second end of the first rope in a first direction. In an exemplary embodiment, detaching each respective detachable ring of the first plurality of detachable rings from the first side of the outer surface of the balloon may be done responsive to the first point of the blanket hitting each respective detachable ring of the first plurality of detachable rings.

In an exemplary embodiment, obtaining the first guideway may include attaching a bottom side of a first strip to the first side of the outer surface of the balloon and detachably attaching the first plurality of detachable rings to a top side of the first strip.

In an exemplary embodiment, detachably attaching the first plurality of detachable rings to the top side of the first strip may include attaching the first plurality of detachable rings to the top side of the first strip by utilizing an adhesive substance.

In an exemplary embodiment, pulling the second end of the first rope in the first direction may include coupling the second end of the first rope to a first winch and pulling the second end of the first rope in the first direction utilizing the first winch. In an exemplary embodiment, detachably attaching the first plurality of detachable rings to the top side of the first strip may include attaching a first self-adhesive woven polyester to the top side of the first strip and attaching the first plurality of detachable rings to the first self-adhesive woven polyester.

In an exemplary embodiment, the method may further include obtaining a second guideway, placing a second rope into the second guideway, attaching a first end of the second rope to a second point of the blanket, and pulling the blanket over the balloon by simultaneously pulling a second end of the second rope in the first direction and pulling the second end of the first rope in the first direction.

In an exemplary embodiment, pulling the blanket over the balloon may further include guiding the second point of the blanket to move along the second guideway and detaching each respective detachable ring of the second plurality of detachable rings from the second side of the outer surface of the balloon. In an exemplary embodiment, guiding the second point of the blanket to move along the second guideway may be done by pulling the second end of the second rope in the first direction. In an exemplary embodiment, detaching each respective detachable ring of the second plurality of detachable rings from the second side of the outer surface of the balloon may be done responsive to the second point of the blanket hitting each respective detachable ring of the second plurality of detachable rings.

In an exemplary embodiment, obtaining the second guideway may include attaching a bottom side of a second strip to the second side of the outer surface of the balloon and detachably attaching the second plurality of detachable rings to a top side of the second strip. In an exemplary embodiment, detachably attaching the second plurality of detachable rings to the top side of the second strip may include attaching the second plurality of detachable rings to the top side of the second strip by utilizing the adhesive substance.

In an exemplary embodiment, pulling the second end of the second rope in the first direction may include coupling the second end of the second rope to a second winch and pulling the second end of the second rope in the first direction utilizing the second winch. In an exemplary embodiment, detachably attaching the second plurality of detachable rings to the top side of the second strip may include attaching a second self-adhesive woven polyester to the top side of the first strip and attaching the second plurality of detachable rings to the second self-adhesive woven polyester.

BRIEF DESCRIPTION OF THE DRAWINGS

The drawing figures depict one or more implementations in accord with the present teachings, by way of example only, not by way of limitation. In the figures, like reference numerals refer to the same or similar elements.

12B illustrates a perspective view of a blimp in a scenario in which a first end of a first rope is connected to a first point of a blanket and a first end of a second rope is connected to a second point of a blanket, consistent with one or more exemplary embodiments of the present disclosure.

Figure 12A:
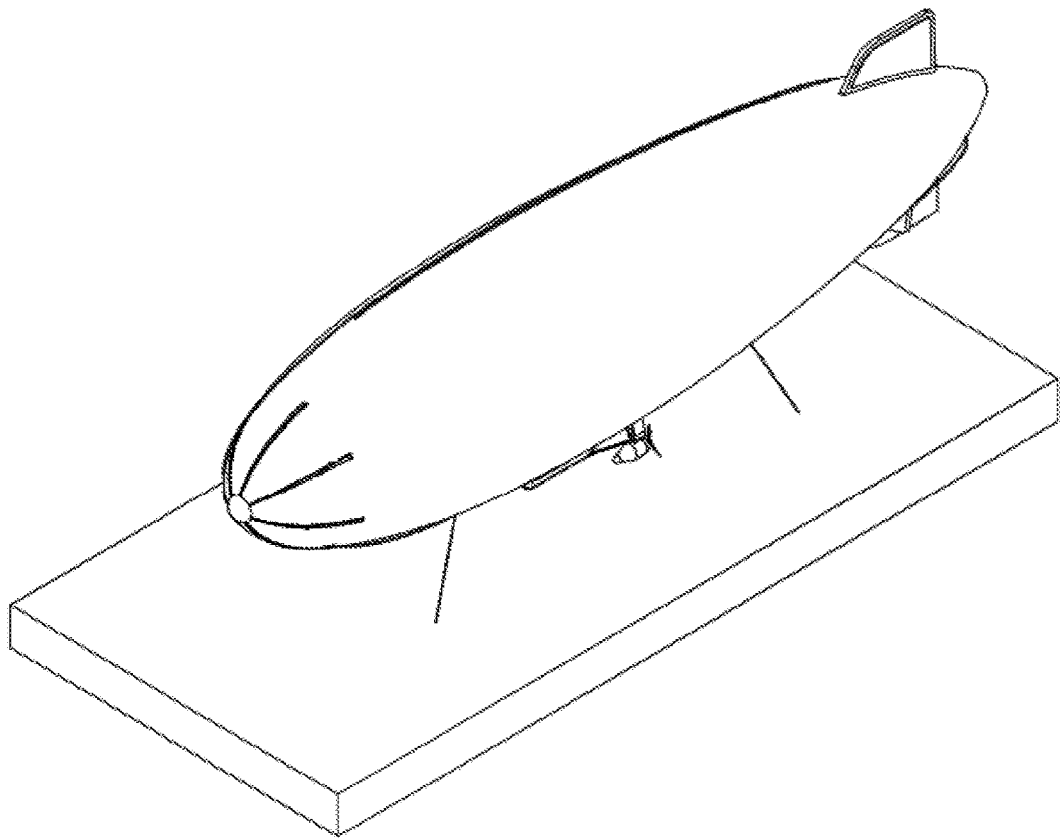
FIG. 12A illustrates a perspective view of a blimp, consistent with one or more exemplary embodiments of the present disclosure.
Figure 12B:
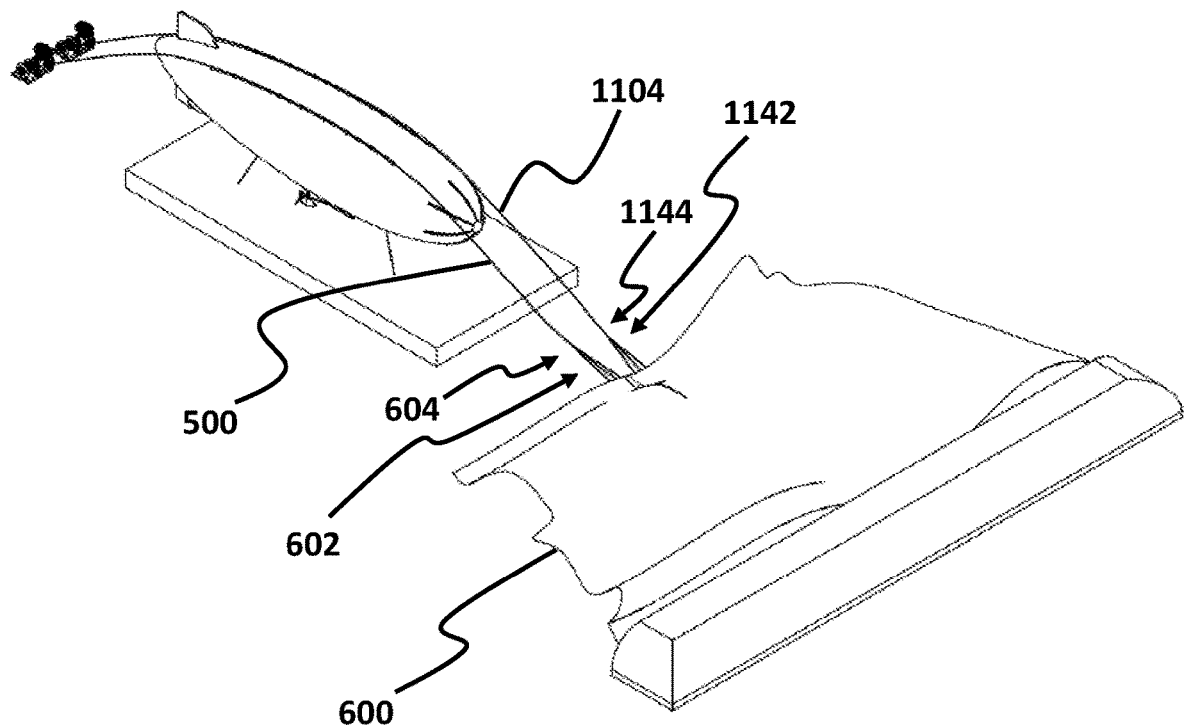
Figure 12C:
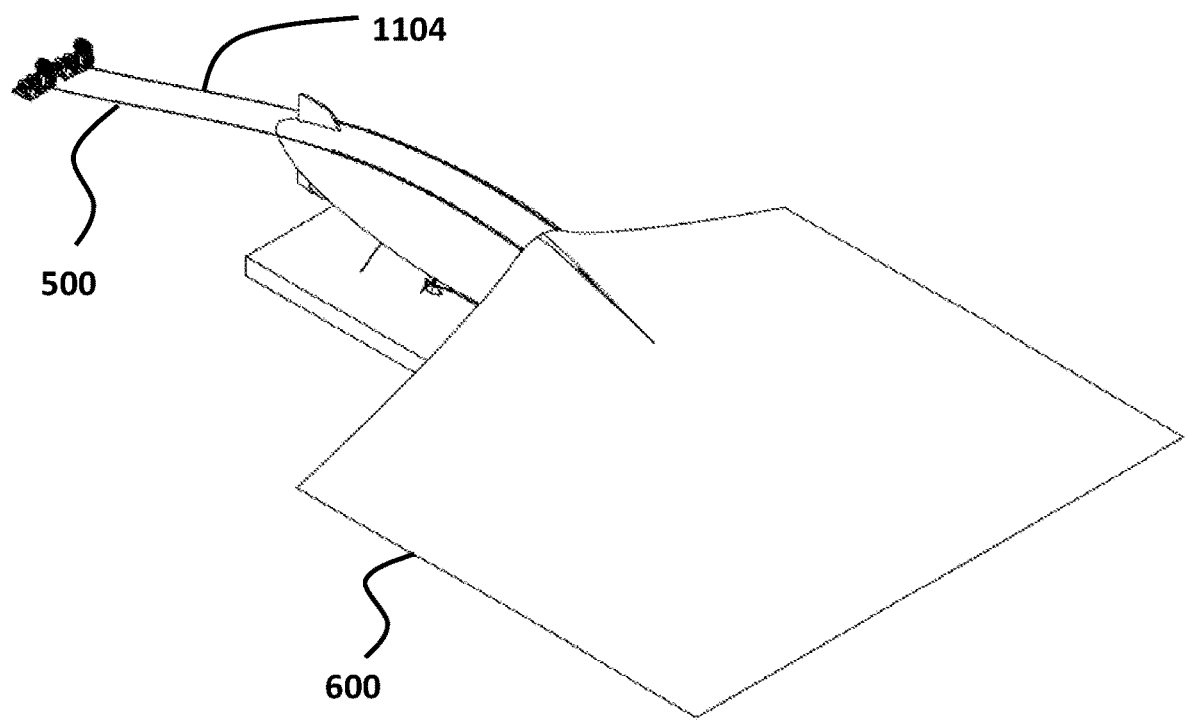

FIG. 12C illustrates a perspective view of a blimp in a first scenario in which a first part of the blimp is covered by a blanket, consistent with one or more exemplary embodiments of the present disclosure.

Figure 12D:
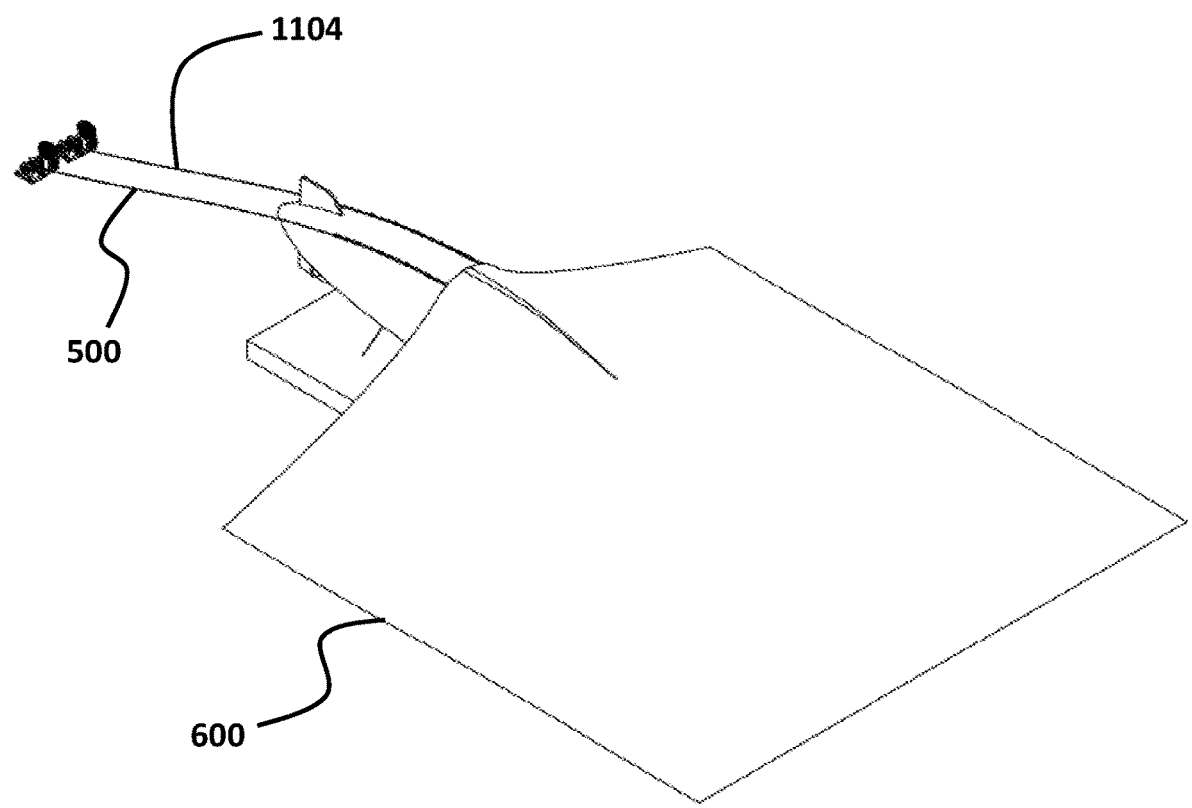

FIG. 12D illustrates a perspective view of a blimp in a second scenario in which a second part 712 of a blimp is covered by a blanket, consistent with one or more exemplary embodiments of the present disclosure.

Figure 12E:
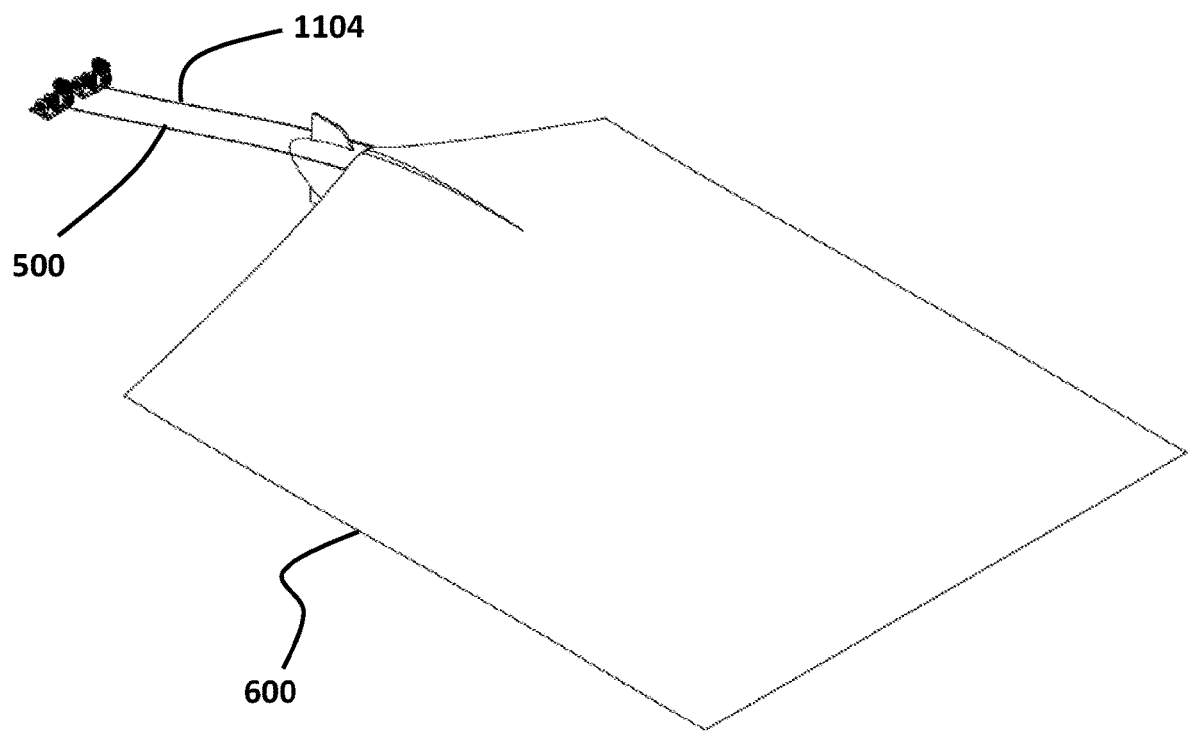

FIG. 12E illustrates a perspective view of a blimp in a third scenario in which a third part of a blimp is covered by a blanket, consistent with one or more exemplary embodiments of the present disclosure.

Figure 12F:
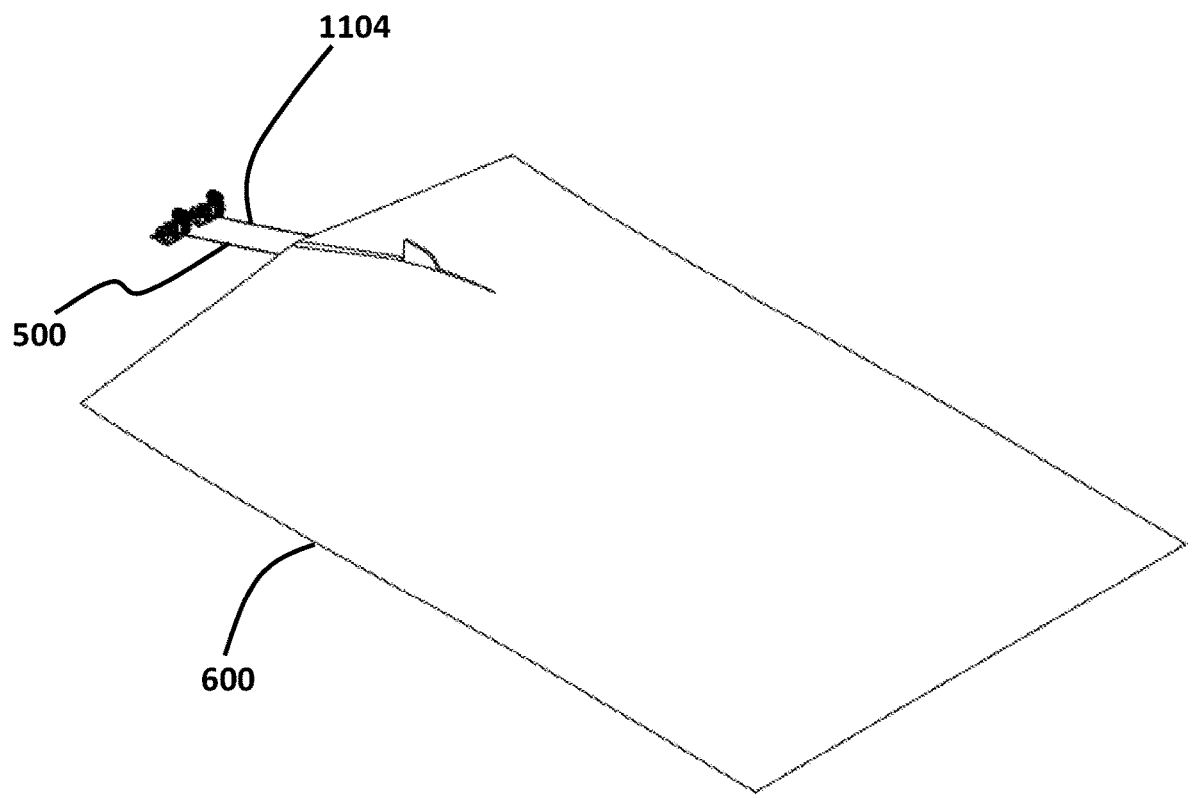

FIG. 12F illustrates a perspective view of a blimp in a fourth scenario in which whole of a blimp is covered by a blanket, consistent with one or more exemplary embodiments of the present disclosure.

Figure 12G:
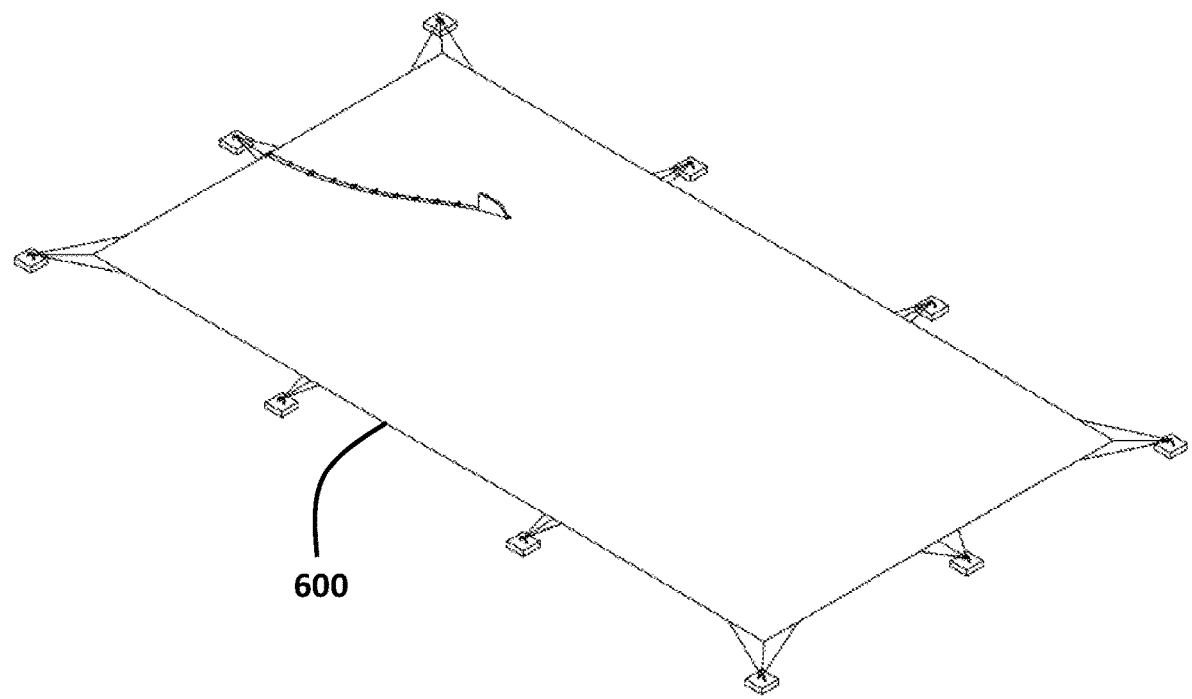

FIG. 12G illustrates a perspective view of a blimp in a fifth scenario in which whole of a blimp is covered by a blanket and the blanket is bound to the ground, consistent with one or more exemplary embodiments of the present disclosure.

Figure 13:
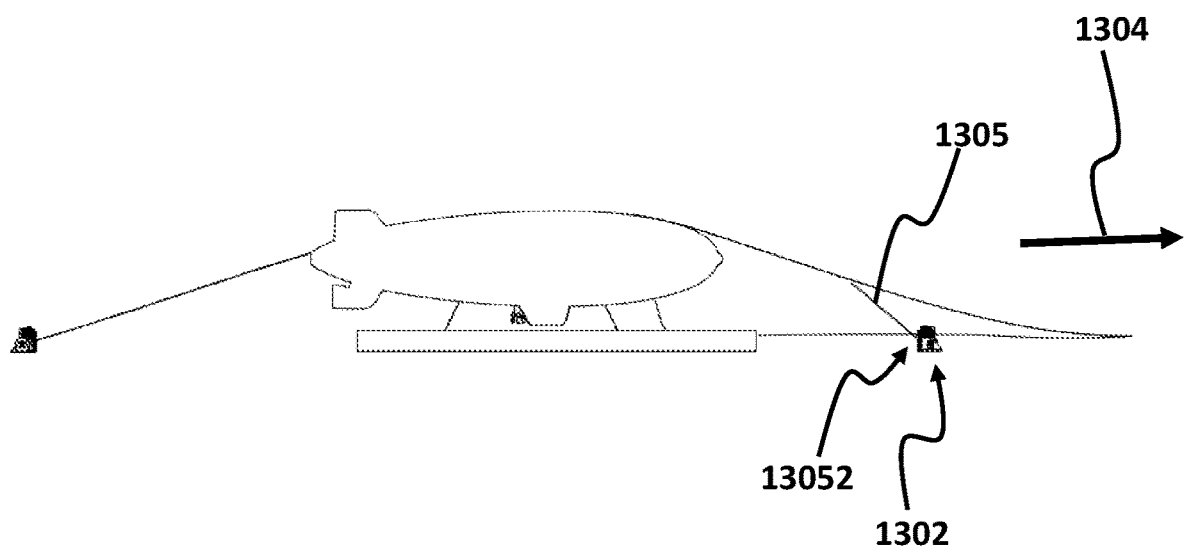

FIG. 13 illustrates a side view of a blimp, consistent with one or more exemplary embodiments of the present disclosure.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed a method for sheltering a balloon, a blimp, an airship, or a tethered helium balloon. An exemplary method may include attaching a strip from a first side of the strip to a top section of an outer surface of a balloon. Then, a series of detachable rings may be attached to a second side of the strip. Then, a rope may be passed through the series of detachable rings. An end of the rope may be attached to a blanket and the other end of the rope may be pulled in a direction such that the blanket is pulled over the balloon or covers the balloon. As an exemplary blanket is being pulled utilizing the tope, when the blanket reaches each respective detachable ring, a pull force of the rope causes the detachable ring to detach from the strip and, consequently, the blanket may move forward on the outer surface of the balloon and is pulled over the balloon.

Figure 1:
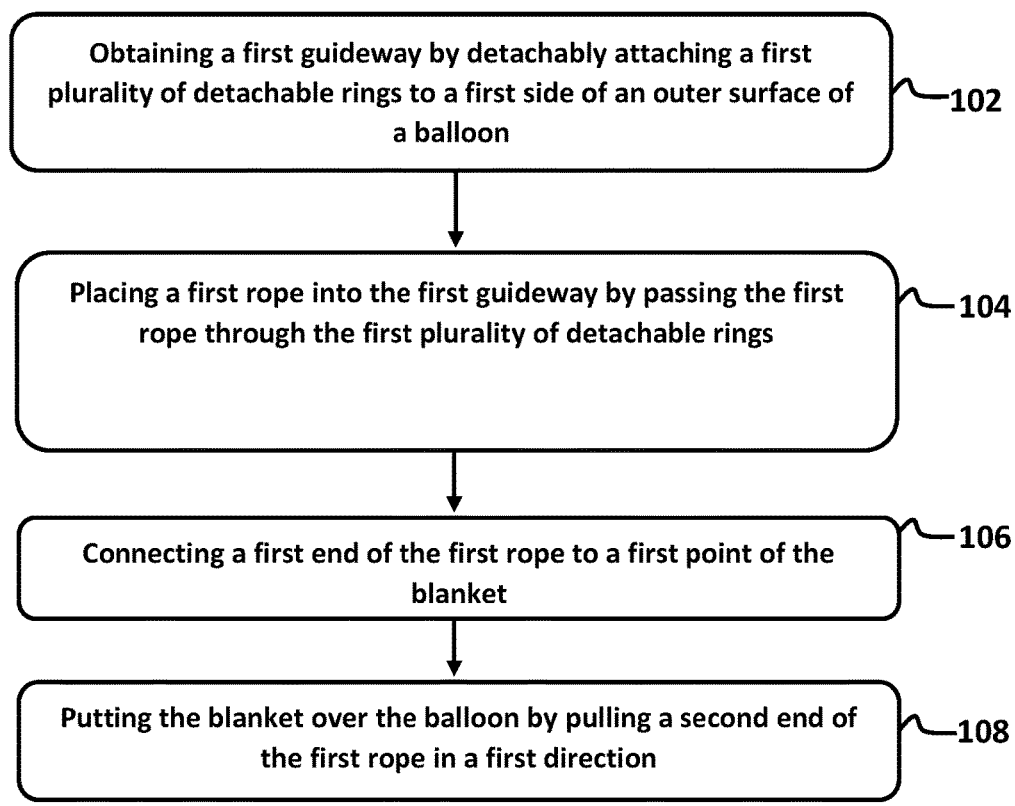
FIG. 1 illustrates a flowchart of a method for sheltering a balloon, consistent with one or more exemplary embodiments of the present disclosure.

FIG. 1 shows a flowchart of a method for sheltering a balloon, consistent with one or more exemplary embodiments of the present disclosure. As shown in FIG. 1, an exemplary method 100 may include obtaining a first guideway by attaching a first plurality of detachable rings to a first side of an outer surface of the balloon (step 102), placing a first rope into the first guideway by passing the first rope through the first plurality of detachable rings (step 104), connecting a first end of the first rope to a first point of a blanket (step 106), and pulling the blanket over the balloon by pulling a second end of the first rope in a first direction (step 108). In an exemplary embodiment, method 100 may facilitate and expedite sheltering a balloon, a blimp, an airship, or a tethered helium balloon in an efficient and cost effective manner.

Figure 2:
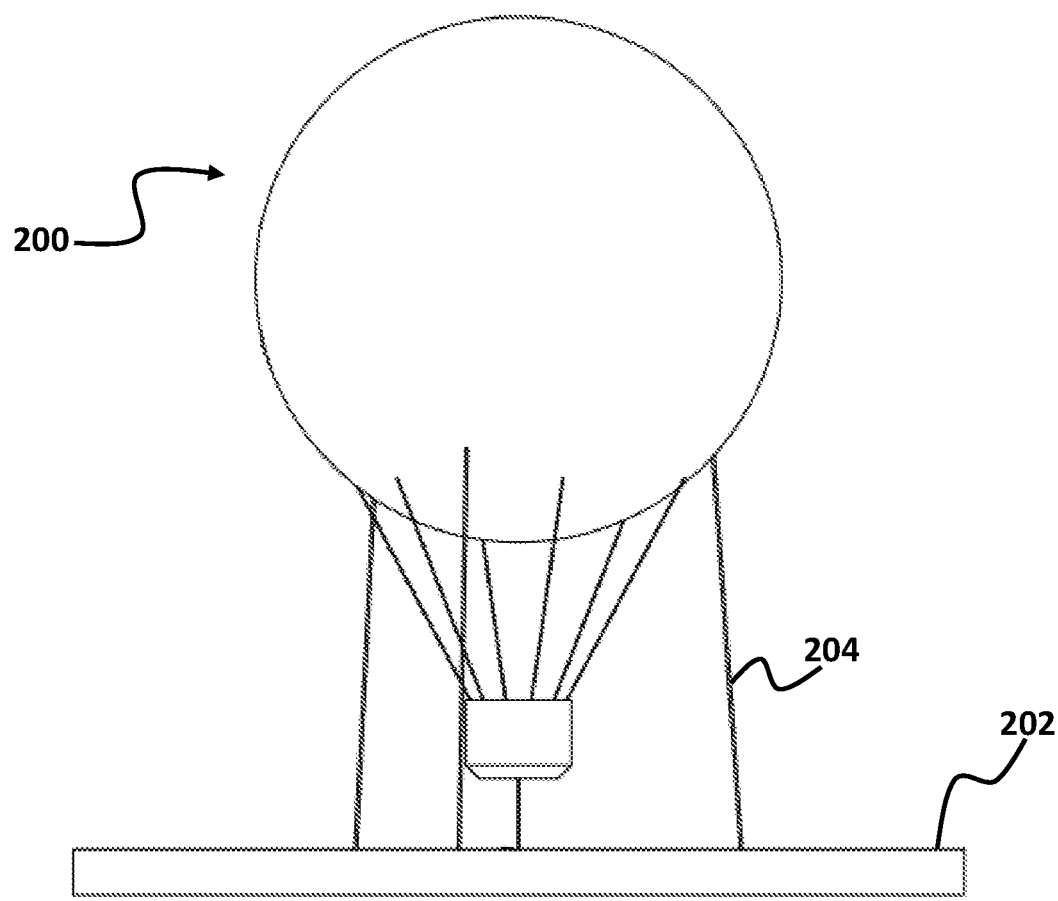
FIG. 2 illustrates a side view of a balloon, consistent with one or more exemplary embodiments of the present disclosure.

FIG. 2 shows a side view of a balloon 200, consistent with one or more exemplary embodiments of the present disclosure. As shown in FIG. 2, in an exemplary embodiment, method 100 may be implemented when balloon 200 is in a moored position. In an exemplary embodiment, a moored position of a balloon such as exemplary balloon 200 may refer to a position of the balloon in which the balloon is tethered to a ground such as a ground 202 with a plurality of mooring cables such as an exemplary mooring cable 204. In an exemplary embodiment, when balloon 200 is in a moored position, balloon 200 may not be able to float freely in the air. However, in an exemplary embodiment, method 100 may be implemented when balloon 200 is not in a moored position.

Figure 3:
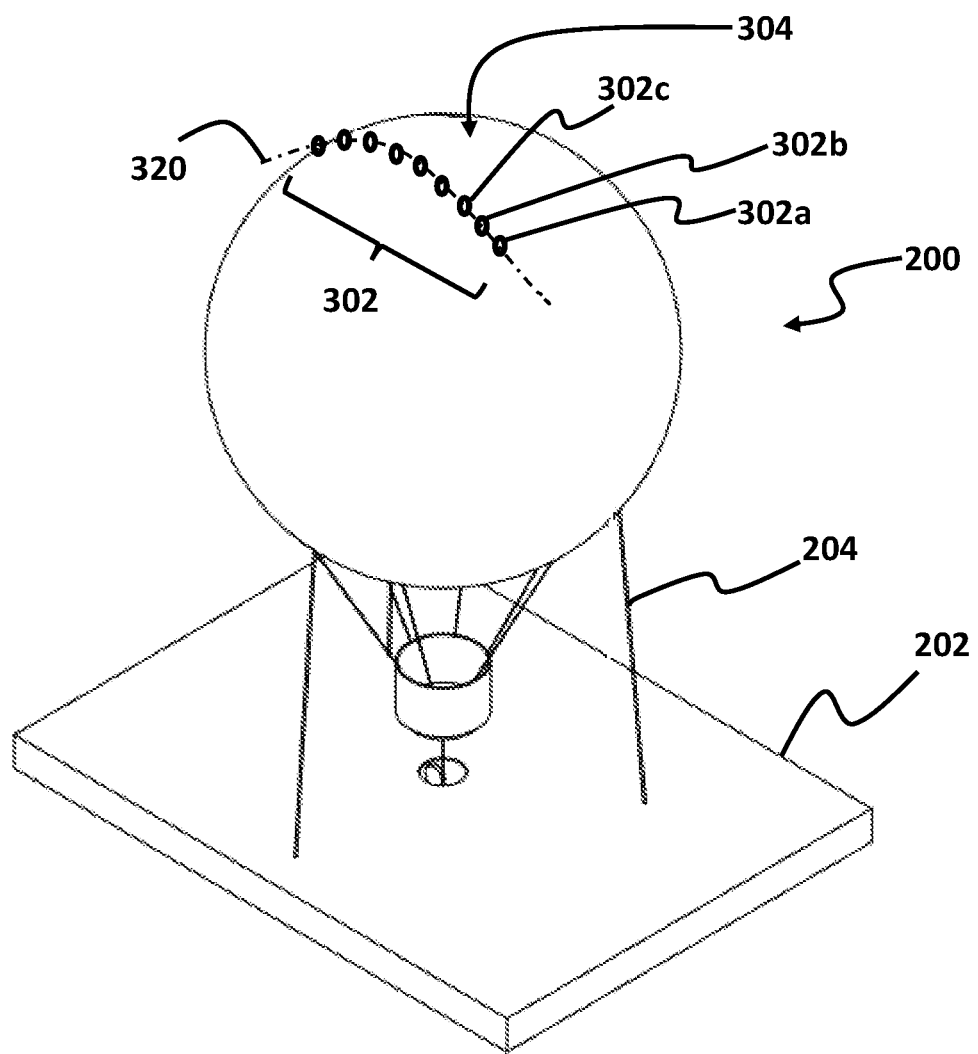
FIG. 3 illustrates a perspective view of a balloon, consistent with one or more exemplary embodiments of the present disclosure.

FIG. 3 shows a perspective view of balloon 200, consistent with one or more exemplary embodiments of the present disclosure. As shown in FIG. 3, in an exemplary embodiment, in order to implement step 102 of method 100, a first plurality of detachable rings 302 may be attached to an outer surface 304 of balloon 200. In an exemplary embodiment, first plurality of detachable rings 302 may include a first detachable ring 302a, a second detachable ring 302b, and a third detachable ring 302c. However, in an exemplary embodiment, first plurality of detachable rings 302 may include more detachable rings in addition to first detachable ring 302a, second detachable ring 302b, and third detachable ring 302c which are shown but not labeled in FIG. 3. In an exemplary embodiment, it may be understood that when first plurality of detachable rings 302 are attached to an outer surface 304 of balloon 200, a first guideway 320 may be formed. In an exemplary embodiment, when an object is passed through first plurality of detachable rings 302, the object may be limited to move along first guideway 320. In an exemplary embodiment, it may be understood that guideway 302 may include a curve on outer surface 304 of balloon 200. In an exemplary embodiment, the curve may include a circular curve or any other geometrical curve.

In an exemplary embodiment, a detachable ring from first plurality of detachable rings 302, for example first detachable ring 302a, may be detachably attached to outer surface 304 of balloon 200. In an exemplary embodiment, it may be understood that when a detachable ring, for example first detachable ring 302a, is detachably attached to outer surface 304 of balloon 200, it may mean that the detachable ring is attached to outer surface 304 of balloon 200 in such a way that the detachable ring may be detached easily from outer surface 304 of balloon 200 by exerting a relatively small force to the detachable ring. In an exemplary embodiment, when a detachable ring is detachably attached to outer surface 304 of balloon 200, the detachable ring may be detached easily from outer surface 304 of balloon 200 by exerting a relatively small force tangential to outer surface 304 of balloon 200. For example, a relatively small tangential force exerted by a rod may detach the detachable ring from outer surface 304 of balloon 200. In an exemplary embodiment, each of first plurality of detachable rings 302, for example first detachable ring 302a, may be attached to outer surface 304 of balloon 200 in such a way that by exerting a force greater than a threshold to first detachable ring 302a, first detachable ring 302a may be detached from outer surface 304 of balloon 200. In an exemplary embodiment, a detachable ring from first plurality of detachable rings 302, for example first detachable ring 302a may be attached to outer surface 304 of balloon 200 by utilizing an adhesive substance. In an exemplary embodiment, a stronger adhesive substance may necessitate a greater force to detach first detachable ring 302a from outer surface 304 of balloon 200.

Figure 4A:
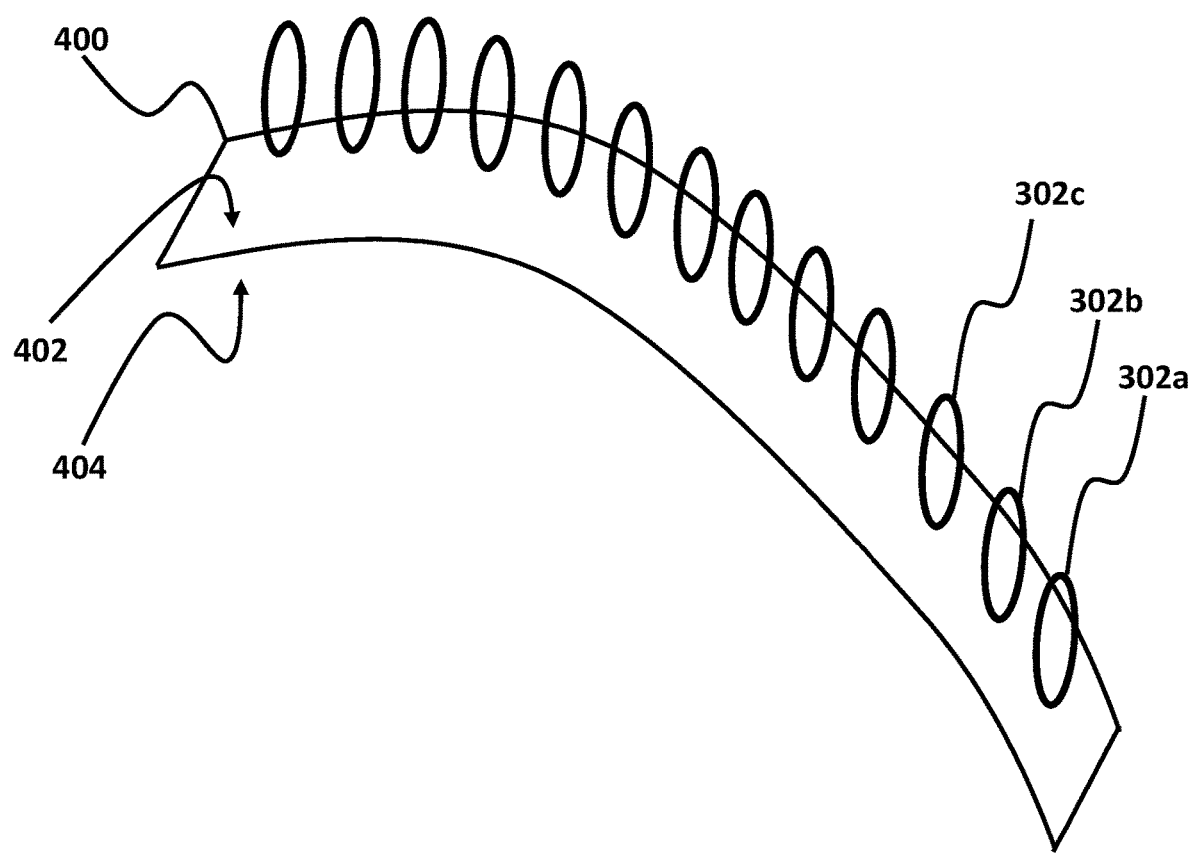
FIG. 4A illustrates a strip, consistent with one or more exemplary embodiments of the present disclosure.
Figure 4B:
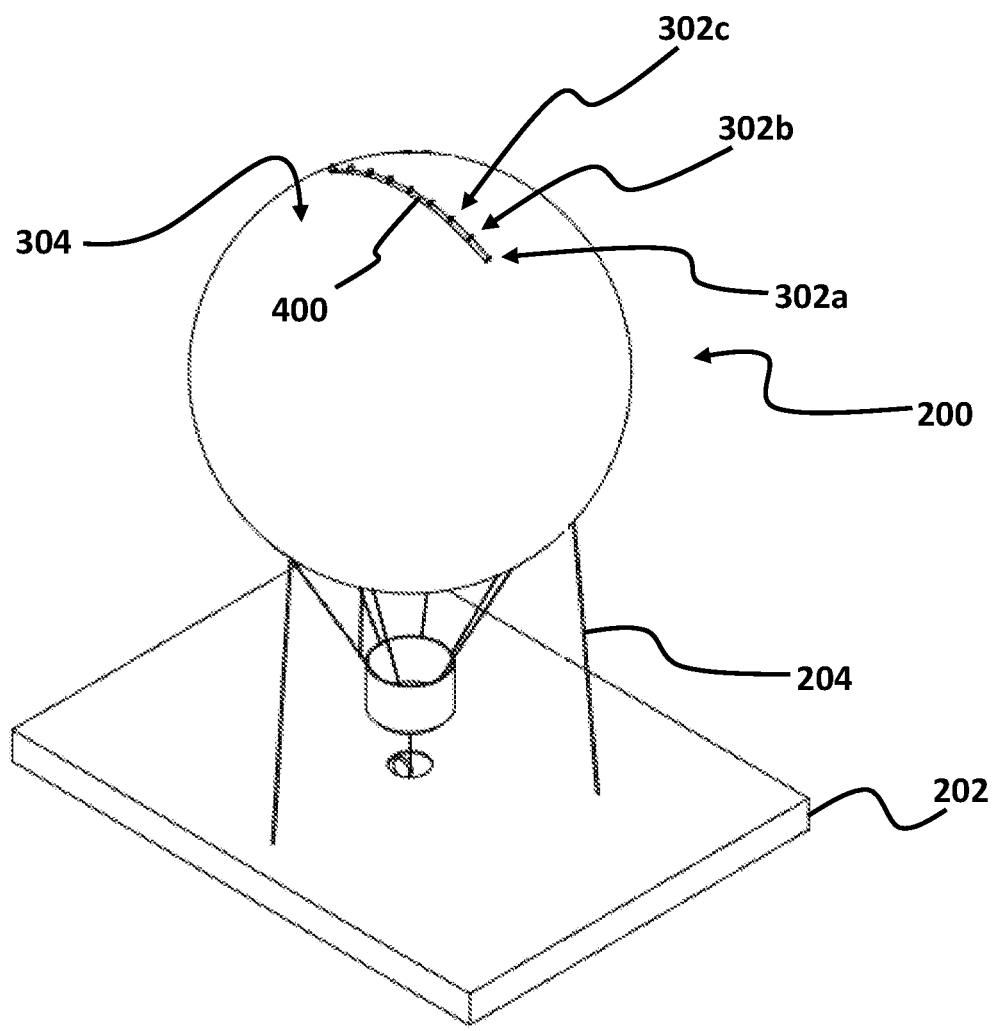
FIG. 4B illustrates a perspective view of a balloon in a scenario in which a first plurality of detachable rings are attached to an outer surface of a balloon utilizing a strip, consistent with one or more exemplary embodiments of the present disclosure.
Figure 4C:
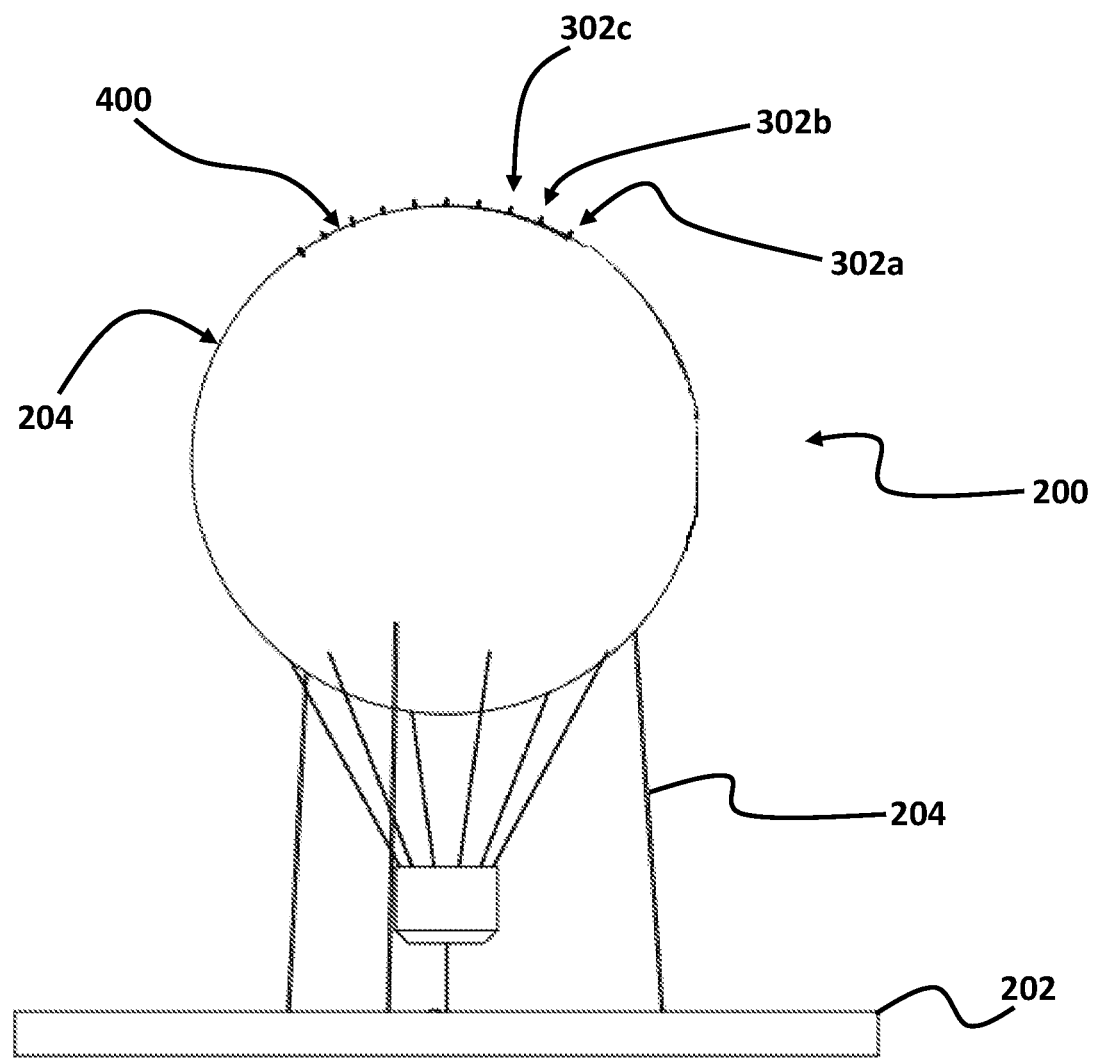
FIG. 4C illustrates a side view of a balloon in a scenario in which a first plurality of detachable rings are attached to an outer surface of a balloon utilizing a strip, consistent with one or more exemplary embodiments of the present disclosure.
Figure 4D:
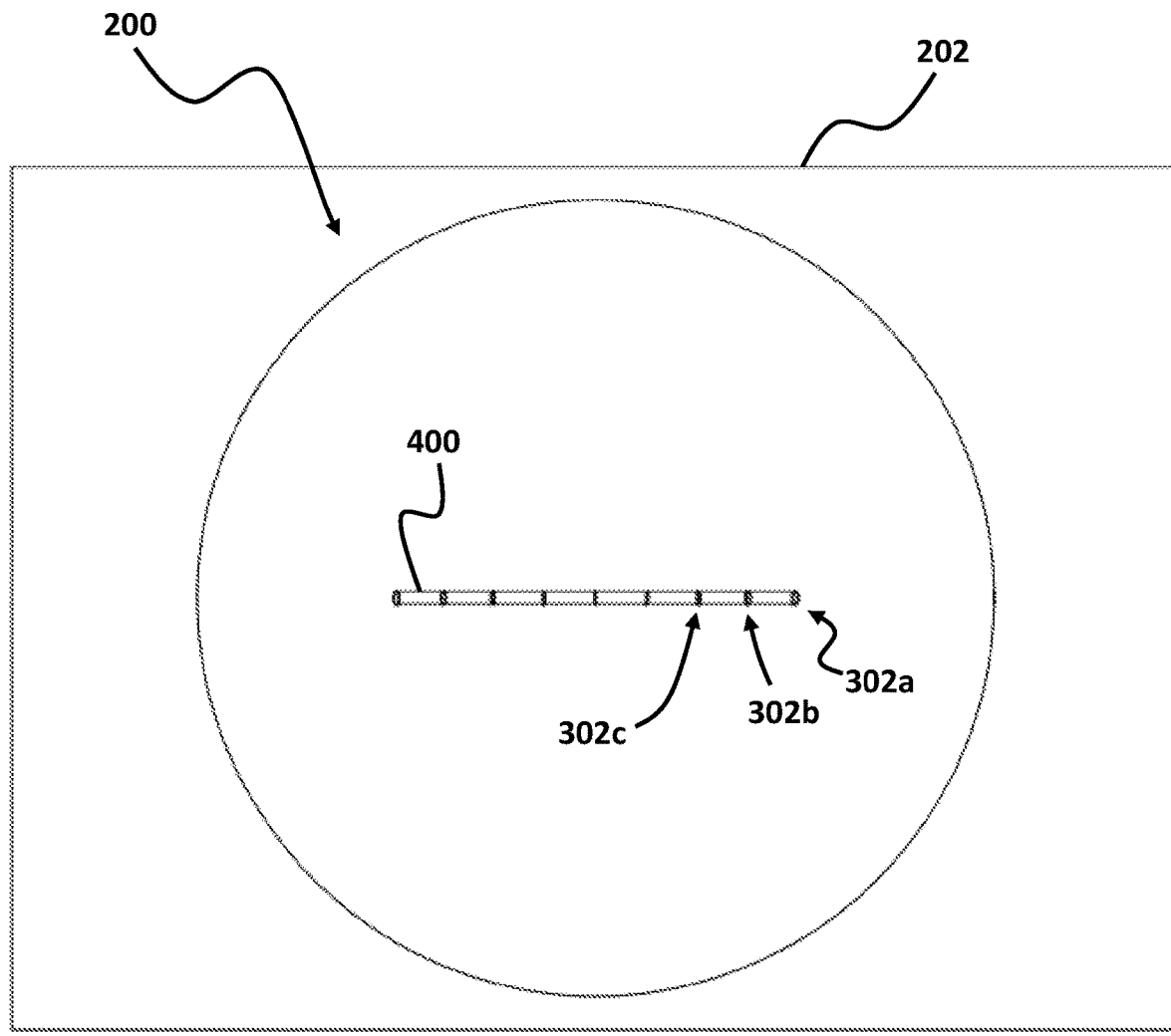
FIG. 4D illustrates a top view of a balloon in a scenario in which a first plurality of detachable rings are attached to an outer surface of a balloon utilizing a strip, consistent with one or more exemplary embodiments of the present disclosure.

In an exemplary embodiment, in order to attach first plurality of detachable rings 302 to outer surface 304 of balloon 200, first plurality of detachable rings 302 may be detachably attached to a top side of a strip and then the strip may be attached fixedly from the bottom side of the strip to outer surface 304 of balloon 200. In an exemplary embodiment, first plurality of detachable rings 302 may be detachably attached to a top side of a strip and then the strip may be attached fixedly from the bottom side of the strip to outer surface 304 of balloon 200 when balloon 200 is deflated. In an exemplary embodiment, first plurality of detachable rings 302 may be detachably attached to a top side of a strip and then the strip may be attached fixedly from the bottom side of the strip to outer surface 304 of balloon 200 when balloon 200 is inflated. For example, an operator may go on top of balloon 200 and detachably attach first plurality of detachable rings 302 to a top side of a strip and then fixedly attach the strip to outer surface 304 of balloon 200. FIG. 4A shows a strip 400, consistent with one or more exemplary embodiments of the present disclosure. As shown in FIG. 4A, in an exemplary embodiment, first plurality of detachable rings 302 may be detachably attached to a top side 402 of strip 400. In an exemplary embodiment, first plurality of detachable rings 302 may be attached to top side 402 of strip 400 by utilizing an adhesive substance. In an exemplary embodiment, it may be understood that when a detachable ring from first plurality of detachable rings 302 is attached to top side 402 of strip 400 by utilizing an adhesive substance, the attached detachable ring may be detached from top side 402 of strip 400 by applying a force greater than a threshold value that represents the force which may be needed to keep the detachable ring attached to top side 402 of strip 400. In an exemplary embodiment, the said threshold may depend on the adhesive substance strength. In an exemplary embodiment, strip 400 may be attached fixedly from a bottom side 404 of strip 400 to outer surface 304 of balloon 200. FIG. 4B shows a perspective view of balloon 200 in a scenario in which first plurality of detachable rings 302 are attached to outer surface 304 of balloon 200 utilizing strip 400, consistent with one or more exemplary embodiments of the present disclosure. FIG. 4C shows a side view of balloon 200 in a scenario in which first plurality of detachable rings 302 are attached to outer surface 304 of balloon 200 utilizing strip 400, consistent with one or more exemplary embodiments of the present disclosure. FIG. 4D shows a top view of balloon 200 in a scenario in which first plurality of detachable rings 302 are attached to outer surface 304 of balloon 200 utilizing strip 400, consistent with one or more exemplary embodiments of the present disclosure. In an exemplary embodiment, in order to detachably attach first plurality of detachable rings 302 to top side 402 of strip 400, a self-adhesive woven polyester may be attached to top side 402 of strip 400 and then first plurality of detachable rings 302 may be attached to the self-adhesive woven polyester. In an exemplary embodiment, the self-adhesive woven polyester may act similar to an adhesive substance. In an exemplary embodiment, when an object is attached to the self-adhesive woven polyester, the object may be detached easily from the self-adhesive woven polyester by applying a force greater than a threshold to the object.

Figure 5A:
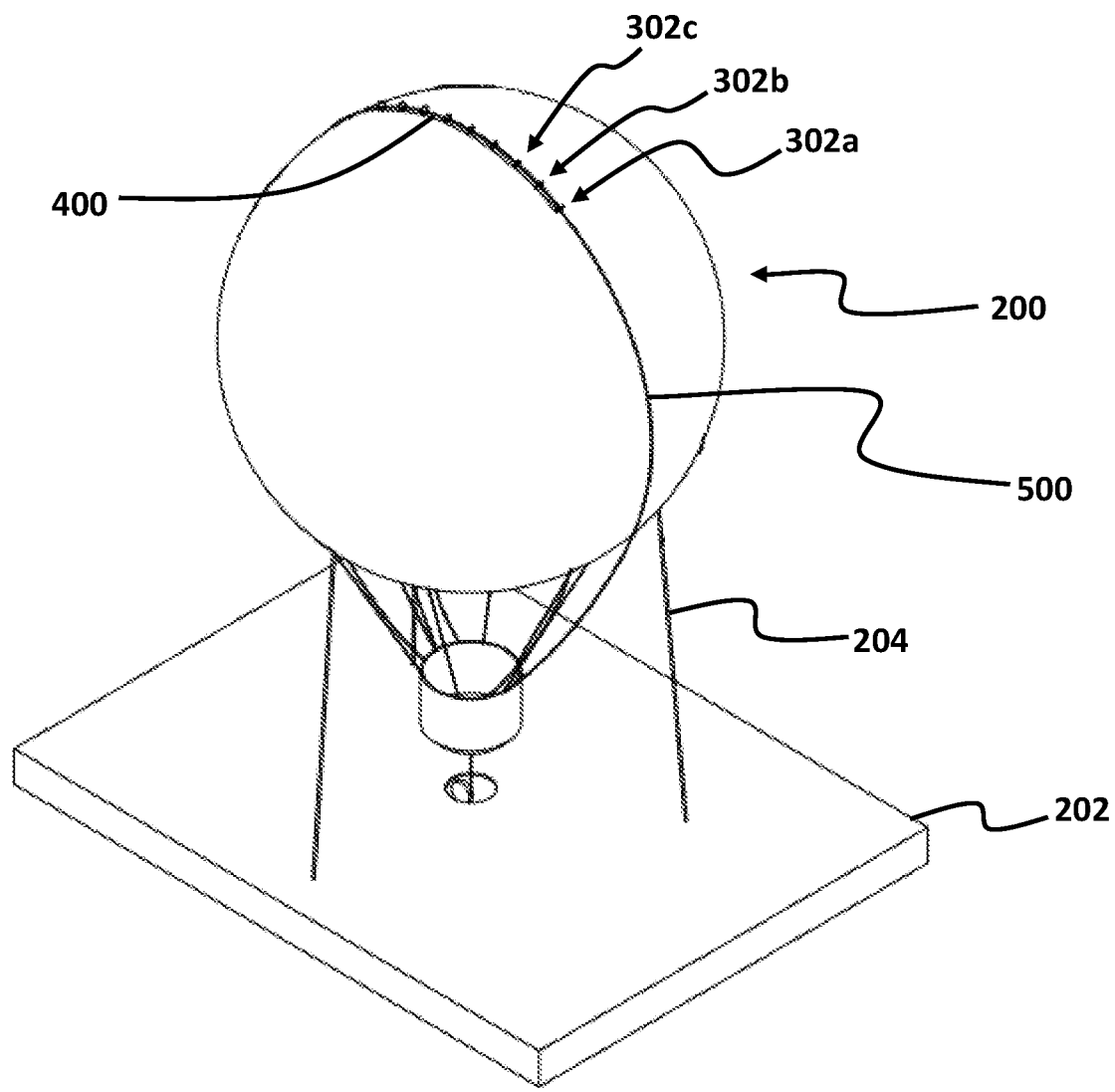
FIG. 5A illustrates a perspective view of a balloon in a scenario in which a first plurality of detachable rings are attached to an outer surface of a balloon and a first rope is passed through a first plurality of detachable rings, consistent with one or more exemplary embodiments of the present disclosure.
Figure 5B:
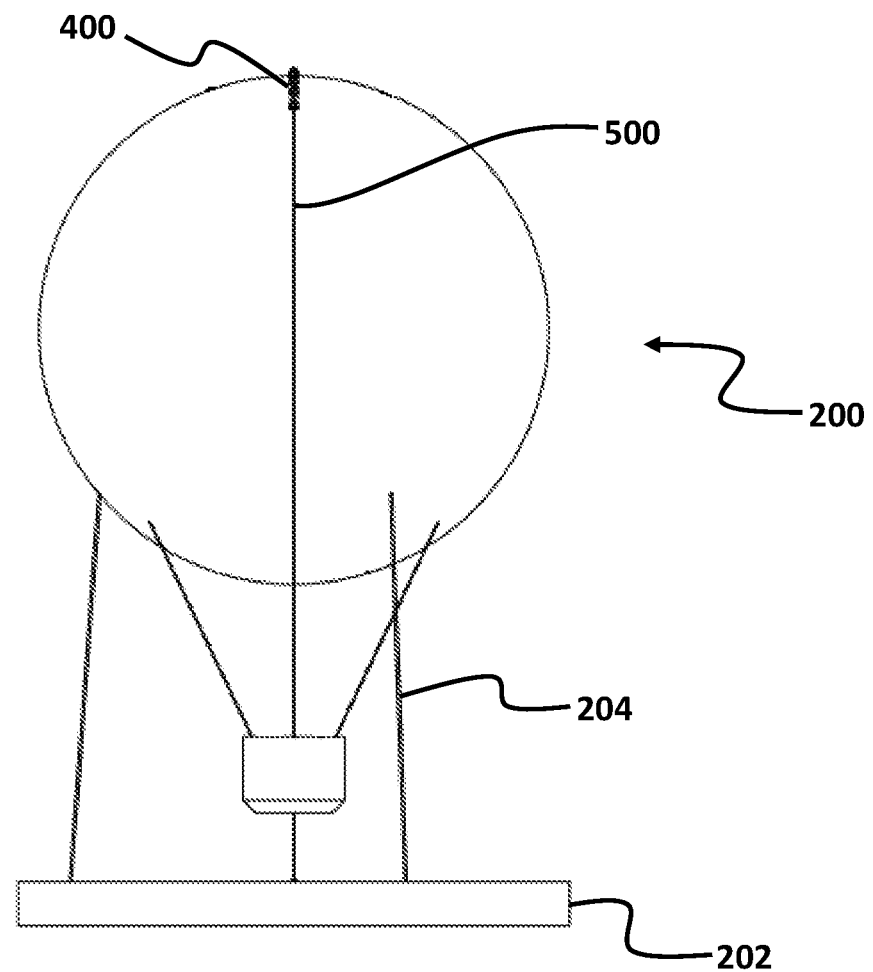
FIG. 5B illustrates a side view of a balloon in a scenario in which a first plurality of detachable rings are attached to an outer surface of a balloon and a first rope is passed through a first plurality of detachable rings, consistent with one or more exemplary embodiments of the present disclosure.
Figure 5C:
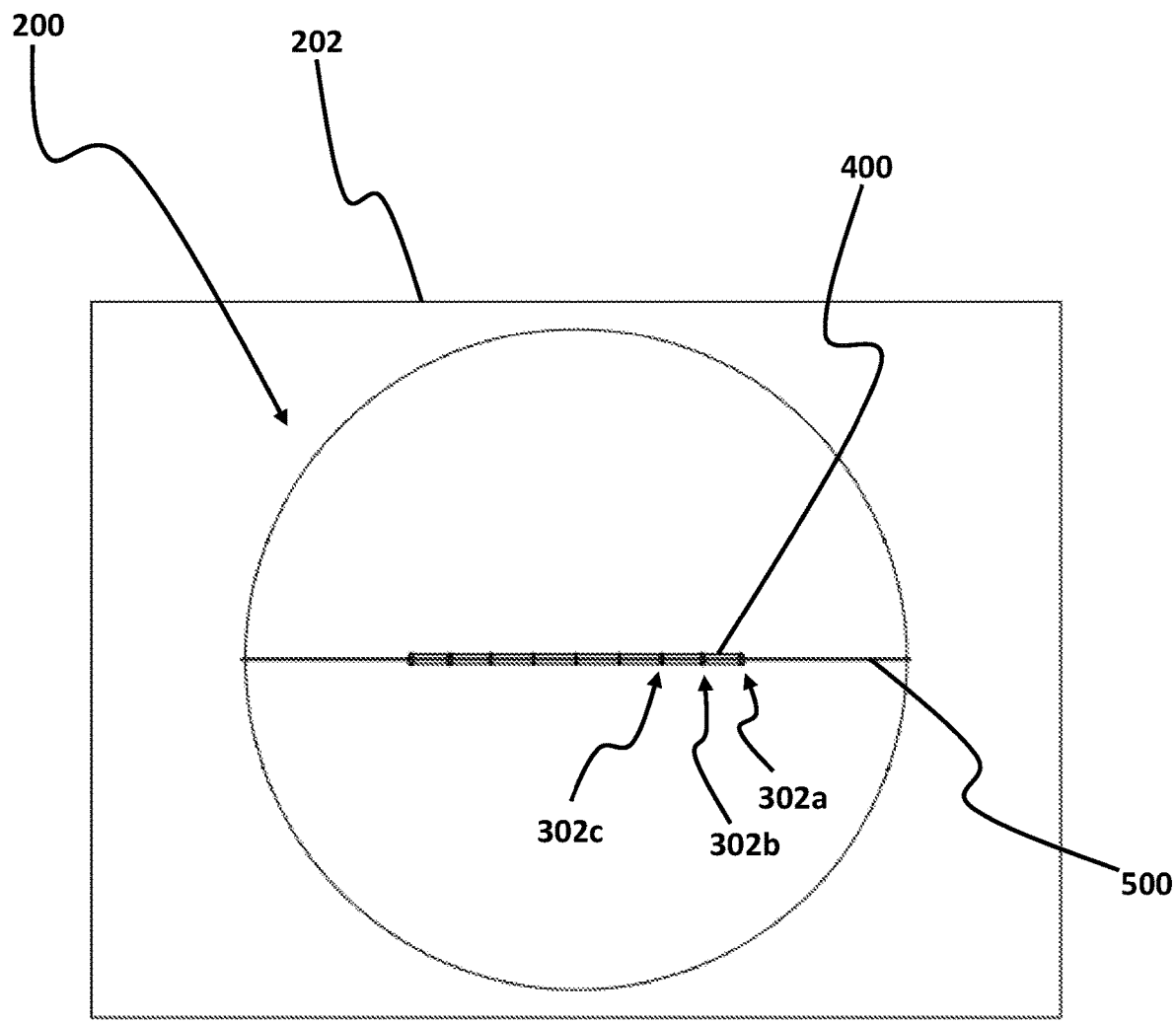
FIG. 5C illustrates a top view of a balloon in a scenario in which a first plurality of detachable rings are attached to an outer surface of a balloon and a first rope is passed through a first plurality of detachable rings, consistent with one or more exemplary embodiments of the present disclosure.

FIG. 5A shows a perspective view of balloon 200 in a scenario in which first plurality of detachable rings 302 are attached to outer surface 304 of balloon 200 and a first rope is passed through first plurality of detachable rings 302, consistent with one or more exemplary embodiments of the present disclosure. FIG. 5B shows a side view of balloon 200 in a scenario in which first plurality of detachable rings 302 are attached to outer surface 304 of balloon 200 and a first rope is passed through first plurality of detachable rings 302, consistent with one or more exemplary embodiments of the present disclosure. FIG. 5C shows a top view of balloon 200 in a scenario in which first plurality of detachable rings 302 are attached to outer surface 304 of balloon 200 and a first rope is passed through first plurality of detachable rings 302, consistent with one or more exemplary embodiments of the present disclosure. As shown in FIG. 5A, FIG. 5B, and FIG. 5C, in an exemplary embodiment, in order to implement step 104 of method 100, a first rope 500 may be passed through first plurality of detachable rings 302. In an exemplary embodiment, it may be understood that when first rope 500 is passed through first plurality of detachable rings 302, first rope 500 may be limited to move along first guideway 320.

Figure 6A:
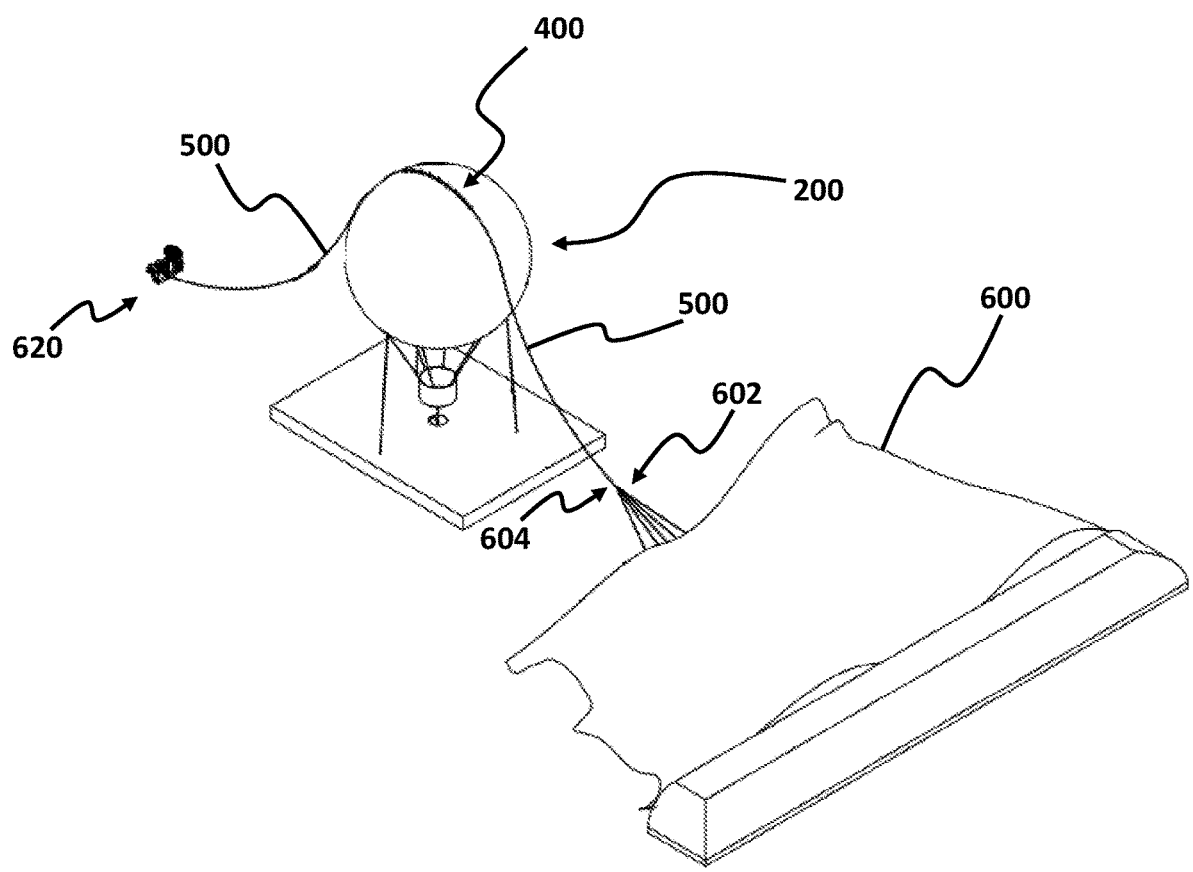
FIG. 6A illustrates a perspective view of a balloon in a scenario in which a first end of a first rope is connected to a first point of a blanket, consistent with one or more exemplary embodiments of the present disclosure.
Figure 6B:
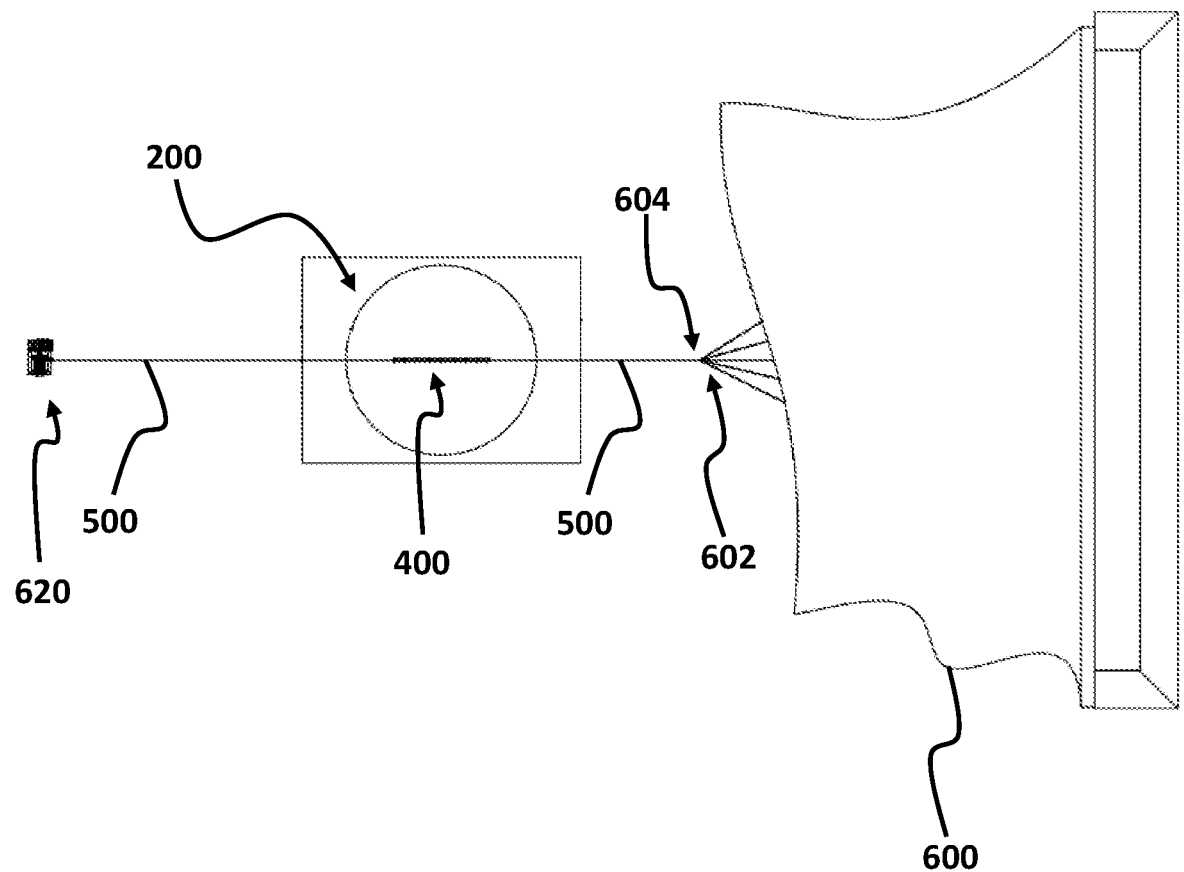
FIG. 6B illustrates a top view of a balloon in a scenario in which a first end of a first rope is connected to a first point of a blanket, consistent with one or more exemplary embodiments of the present disclosure.
Figure 6C:
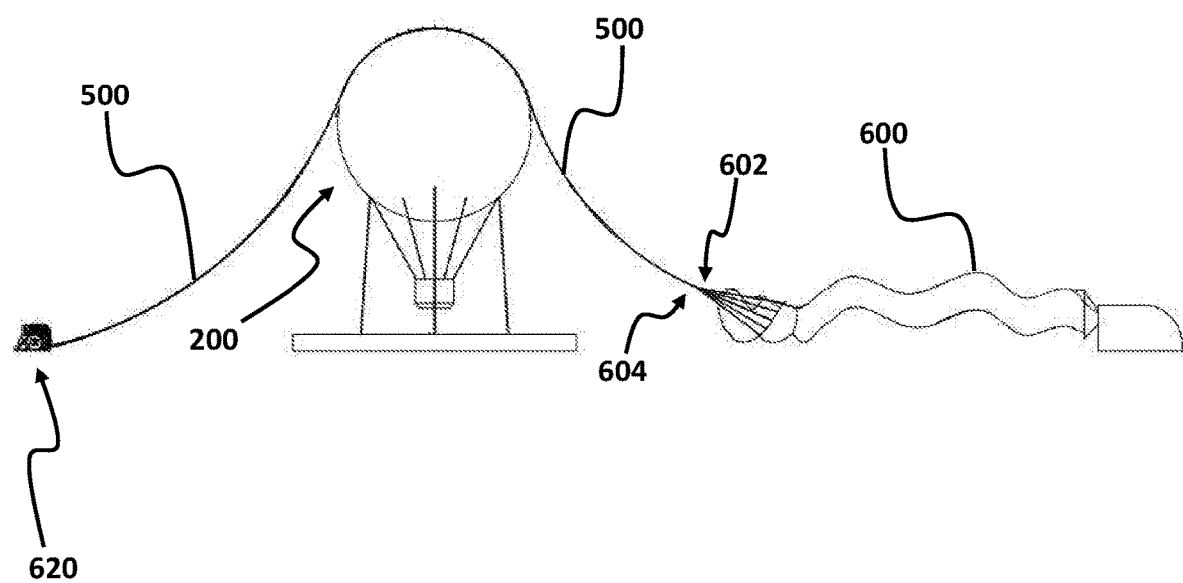
FIG. 6C illustrates a side view of a balloon in a scenario in which a first end of a first rope is connected to a first point of a blanket, consistent with one or more exemplary embodiments of the present disclosure.
Figure 6D:
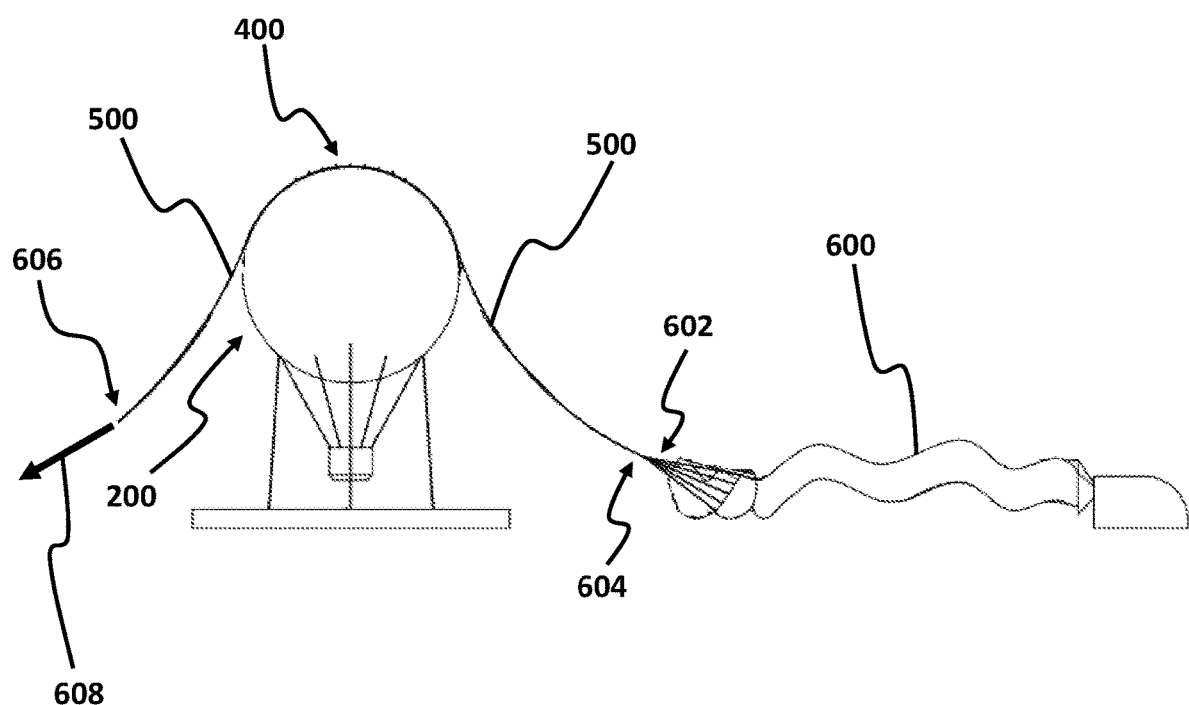
FIG. 6D illustrates another side view of a balloon in a scenario in which a first end of a first rope is connected to a first point of a blanket, consistent with one or more exemplary embodiments of the present disclosure.

In an exemplary embodiment, in order to implement step 106 of method 100, a first end of first rope 500 may be connected to a first point of a blanket. FIG. 6A shows a perspective view of balloon 200 in a scenario in which a first end of first rope 500 is connected to a first point of a blanket, consistent with one or more exemplary embodiments of the present disclosure. FIG. 6B shows a top view of balloon 200 in a scenario in which a first end of first rope 500 is connected to a first point of a blanket, consistent with one or more exemplary embodiments of the present disclosure. FIG. 6C shows a side view of balloon 200 in a scenario in which a first end of first rope 500 is connected to a first point of a blanket, consistent with one or more exemplary embodiments of the present disclosure. As shown in FIG. 6A, FIG. 6B, and FIG. 6C, in an exemplary embodiment, a first end 604 of first rope 500 may be connected to a first point 602 of a blanket 600. In an exemplary embodiment, first point 602 may be at a middle of a side of blanket 600. In an exemplary embodiment, it may be understood that when first end 604 of first rope 500 is connected to first point 602 of blanket 600, blanket 600 may move in an intended direction by pulling first rope 500 in the intended direction.

In an exemplary embodiment, in order to implement step 108 of method 100, a second end 606 of first rope 500 may be pulled in a first direction 608. As shown in FIG. 6A, FIG. 6B, and FIG. 6C, in an exemplary embodiment, second end 606 of first rope 500 may be pulled in a first direction 608 by utilizing a first winch 620. In an exemplary embodiment, second end 606 of first rope 500 may be coupled to first winch 620. In an exemplary embodiment, first winch 620 may be configured to pull second end 606 of first rope 500 in first direction 608. In an exemplary embodiment, when second end 606 of first rope 500 is pulled in first direction 608, first point 602 of blanket 600 may move along first guideway 320 and, to thereby, may pull blanket 600 over balloon 200. In an exemplary embodiment, when first point 602 of blanket 600 hits each detachable ring from first plurality of detachable rings 302, first point 602 of blanket 600 may detach the each ring from outer surface 304 of balloon 200. In an exemplary embodiment, when first point 602 of blanket 600 hits a detachable ring, it may mean that first point 602 of blanket 600 reaches the detachable ring and applies a force to the detachable ring. For example, when first point 602 of blanket 600 hits first detachable ring 302a, first detachable ring 302a may be detached from outer surface 304 of balloon 200. In an exemplary embodiment, it may be understood that when first detachable ring 302a is detached from outer surface 304 of balloon 200, first point 602 of blanket 600 may be able to continue to move along first guideway 320. In an exemplary embodiment, after detaching first detachable ring 302a from outer surface 304 of balloon 200, first point 602 of blanket 600 may move until first point 602 of blanket 600 reaches second detachable ring 302b. In an exemplary embodiment, when first point 602 of blanket 600 hits second detachable ring 302b, second detachable ring 302b may be detached from outer surface 304 of balloon 200. In an exemplary embodiment, it may be understood that when second detachable ring 302b is detached from outer surface 304 of balloon 200, first point 602 of blanket 600 may be able to continue to move along first guideway 320. In an exemplary embodiment, first point 602 of blanket 600 may move along first guideway 320 and detach all of first plurality of detachable rings 302 from outer surface 304 of balloon 200. In an exemplary embodiment, when first point 602 of blanket 600 is passed through all of first plurality of detachable rings 302 and detach all of first plurality of detachable rings 302, a big portion of balloon 200 may be covered by blanket 600. In an exemplary embodiment, it may be understood that when a big portion of balloon 200 is covered by blanket 600, blanket 600 may completely cover balloon 200 by simply pulling second end 606 of first rope 500 in first direction 608. In an exemplary embodiment, a big portion of balloon 200 may refer to any portion of balloon 200 which includes more than half of balloon 200. In an exemplary embodiment, when a big portion of balloon 200 is covered by blanket 600, more than half of balloon 200 may be covered by blanket 600. In an exemplary embodiment, attaching first plurality of detachable rings 302 to outer surface 304 of balloon 200 may provide significant benefits. For example, first plurality of detachable rings 302 may prevent first rope 500 from slipping on outer surface 304 of balloon 200 and falling down from balloon 200. In an exemplary embodiment, it may be understood that by preventing first rope 500 from slipping on outer surface 304 of balloon 200 and falling down from balloon 200, blanket 600 may be easily guided to cover balloon 200.

Figure 7A:
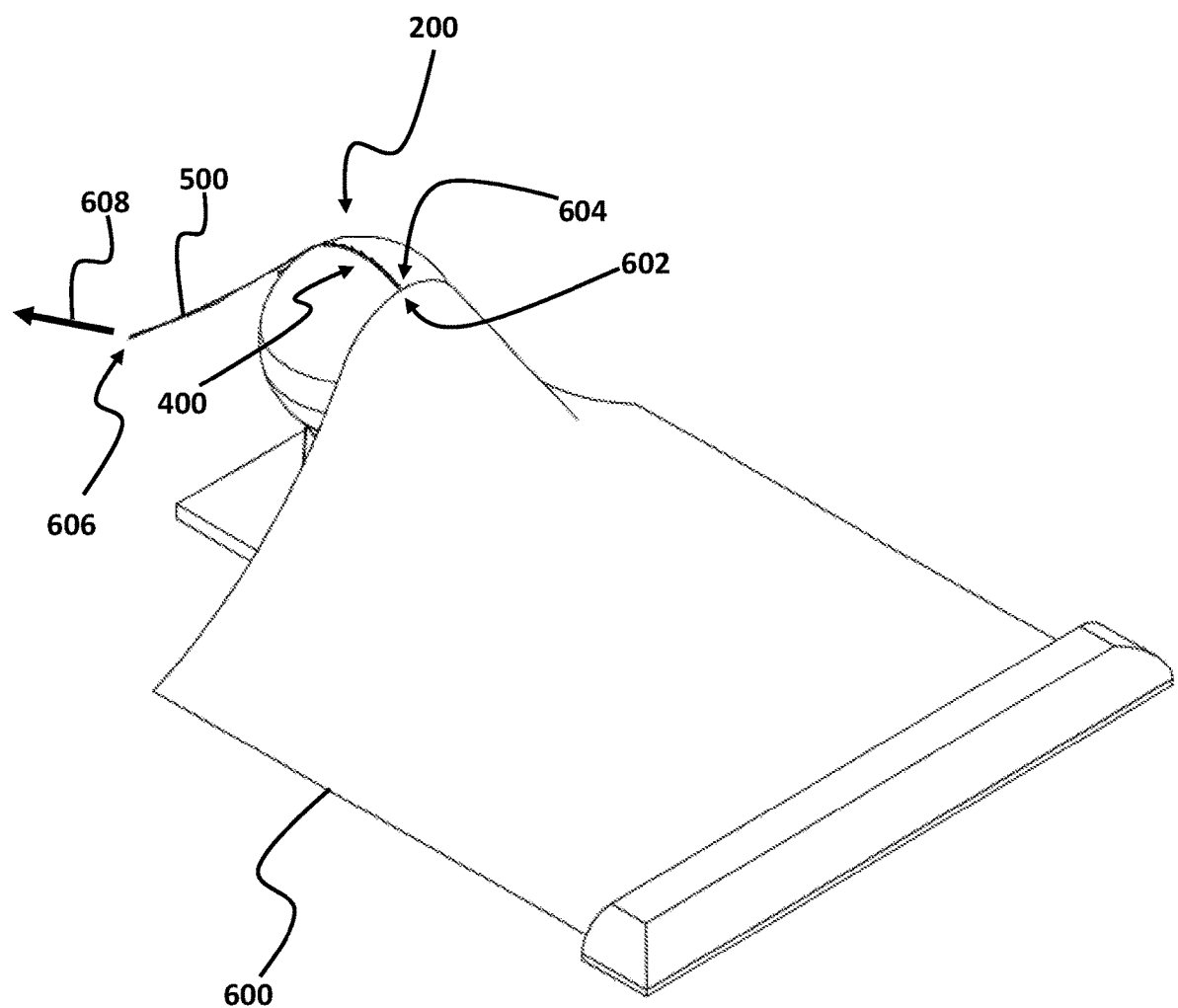
FIG. 7A illustrates a perspective view of a balloon in a first scenario in which a first part of a balloon is covered by a blanket, consistent with one or more exemplary embodiments of the present disclosure.
Figure 7B:
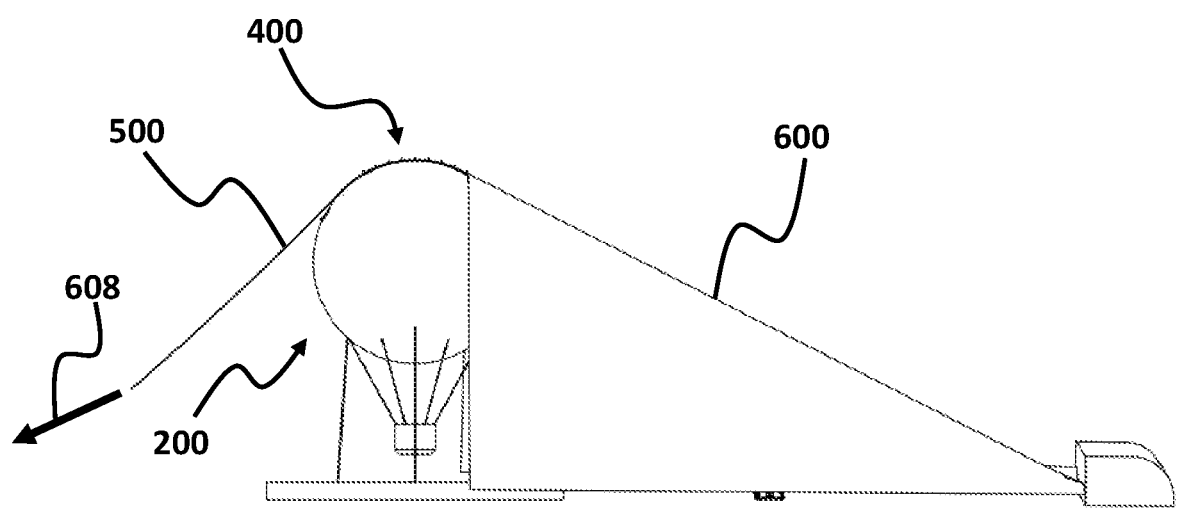
FIG. 7B illustrates a side view of a balloon in a first scenario in which a first part of a balloon is covered by blanket, consistent with one or more exemplary embodiments of the present disclosure.
Figure 7C:
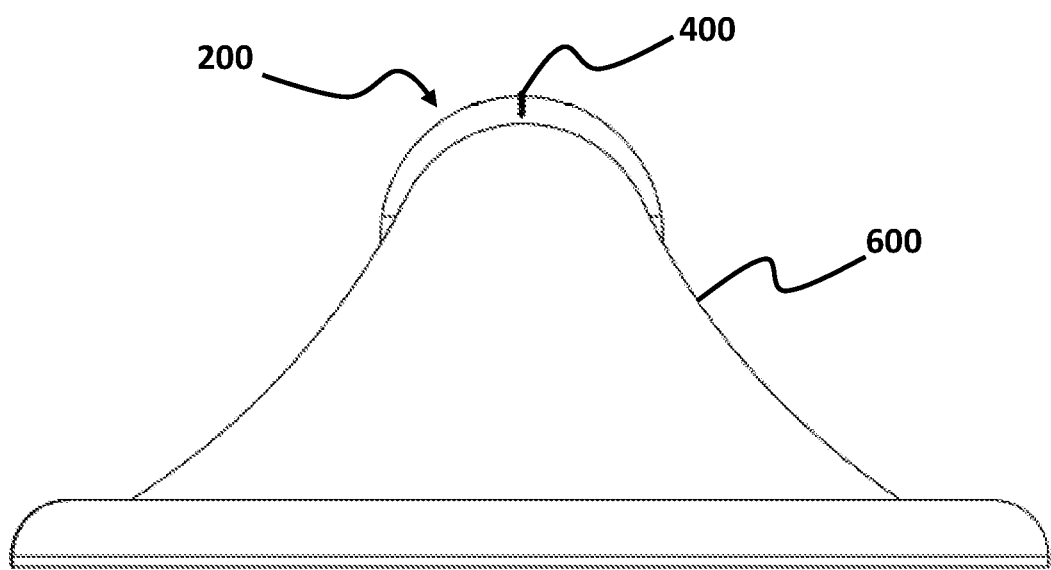
FIG. 7C illustrates another side view of a balloon in a first scenario in which a first part of a balloon is covered by a blanket, consistent with one or more exemplary embodiments of the present disclosure.
Figure 7D:
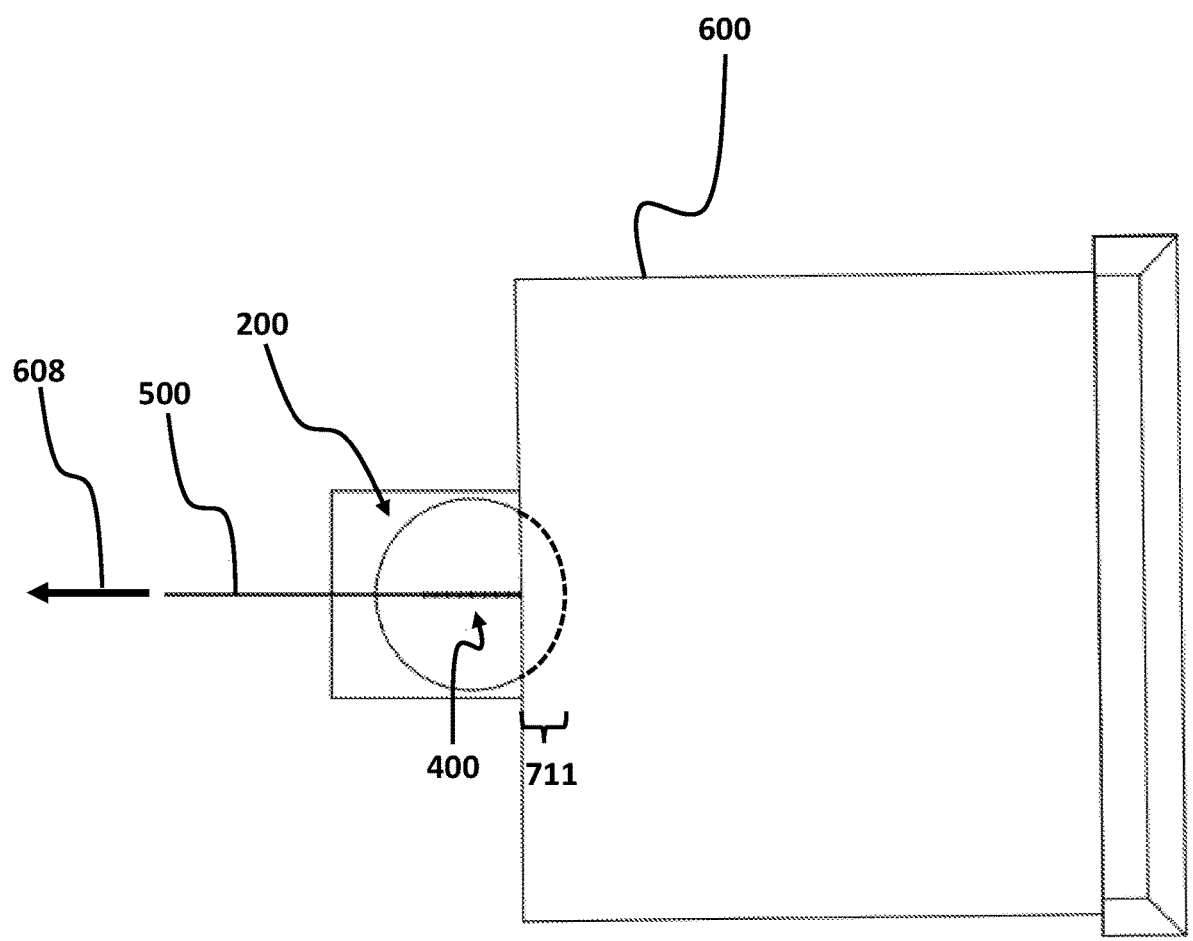
FIG. 7D illustrates a top view of a balloon in a first scenario in which a first part of a balloon is covered by a blanket, consistent with one or more exemplary embodiments of the present disclosure.

FIG. 7A shows a perspective view of balloon 200 in a first scenario in which a first part 711 of balloon 200 is covered by blanket 600, consistent with one or more exemplary embodiments of the present disclosure. FIG. 7B shows a side view of balloon 200 in a first scenario in which first part 711 of balloon 200 is covered by blanket 600, consistent with one or more exemplary embodiments of the present disclosure. FIG. 7C shows another side view of balloon 200 in a first scenario in which first part 711 of balloon 200 is covered by blanket 600, consistent with one or more exemplary embodiments of the present disclosure. FIG. 7D shows a top view of balloon 200 in a first scenario in which first part 711 of balloon 200 is covered by blanket 600, consistent with one or more exemplary embodiments of the present disclosure.

Figure 8A:
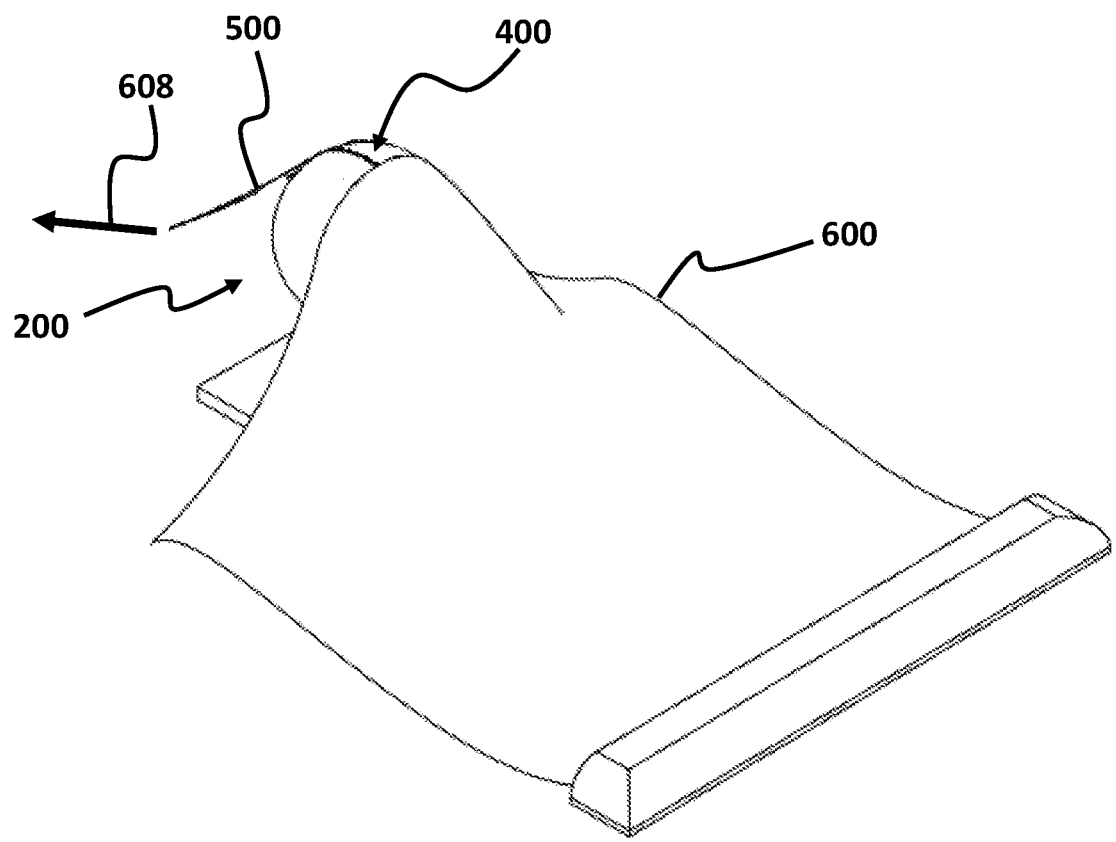
FIG. 8A illustrates a perspective view of a balloon in a second scenario in which a second part of a balloon is covered by a blanket, consistent with one or more exemplary embodiments of the present disclosure.
Figure 8B:
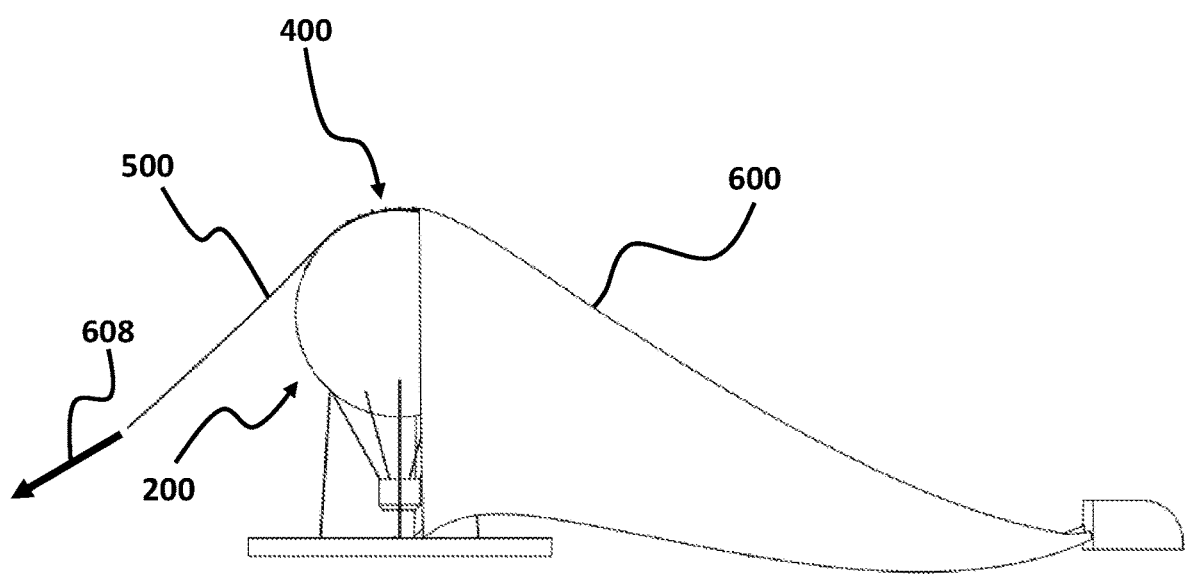
FIG. 8B illustrates a side view of a balloon in a second scenario in which a second part of a balloon is covered by a blanket, consistent with one or more exemplary embodiments of the present disclosure.
Figure 8C:
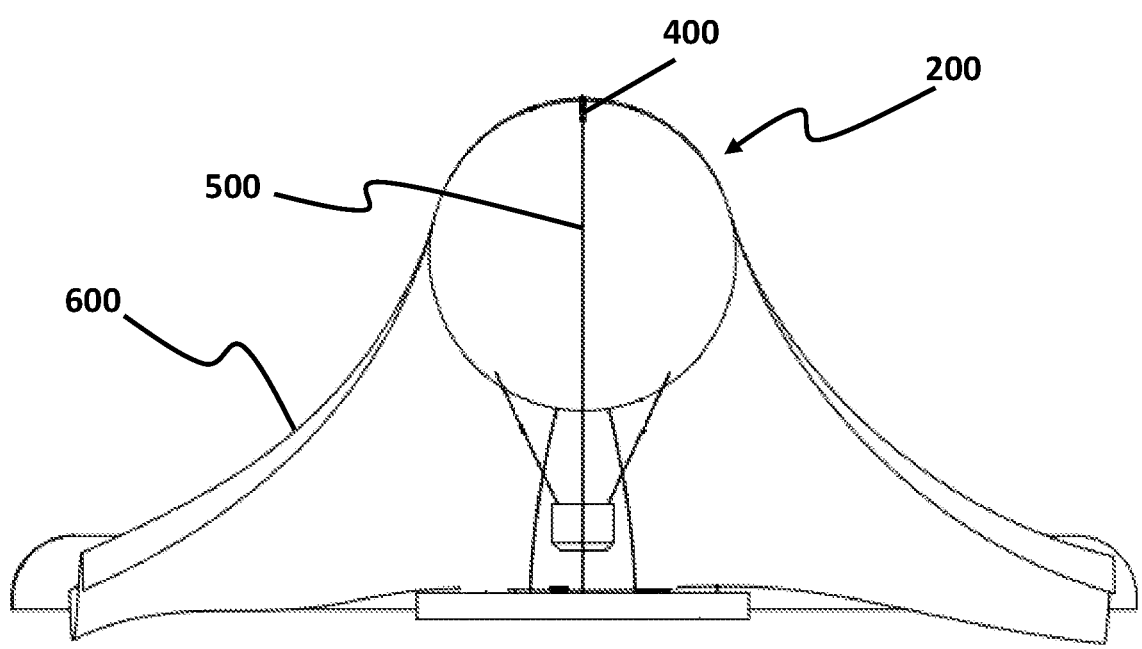
FIG. 8C illustrates another side view of a balloon in a second scenario in which a second part of a balloon is covered by a blanket, consistent with one or more exemplary embodiments of the present disclosure.
Figure 8D:
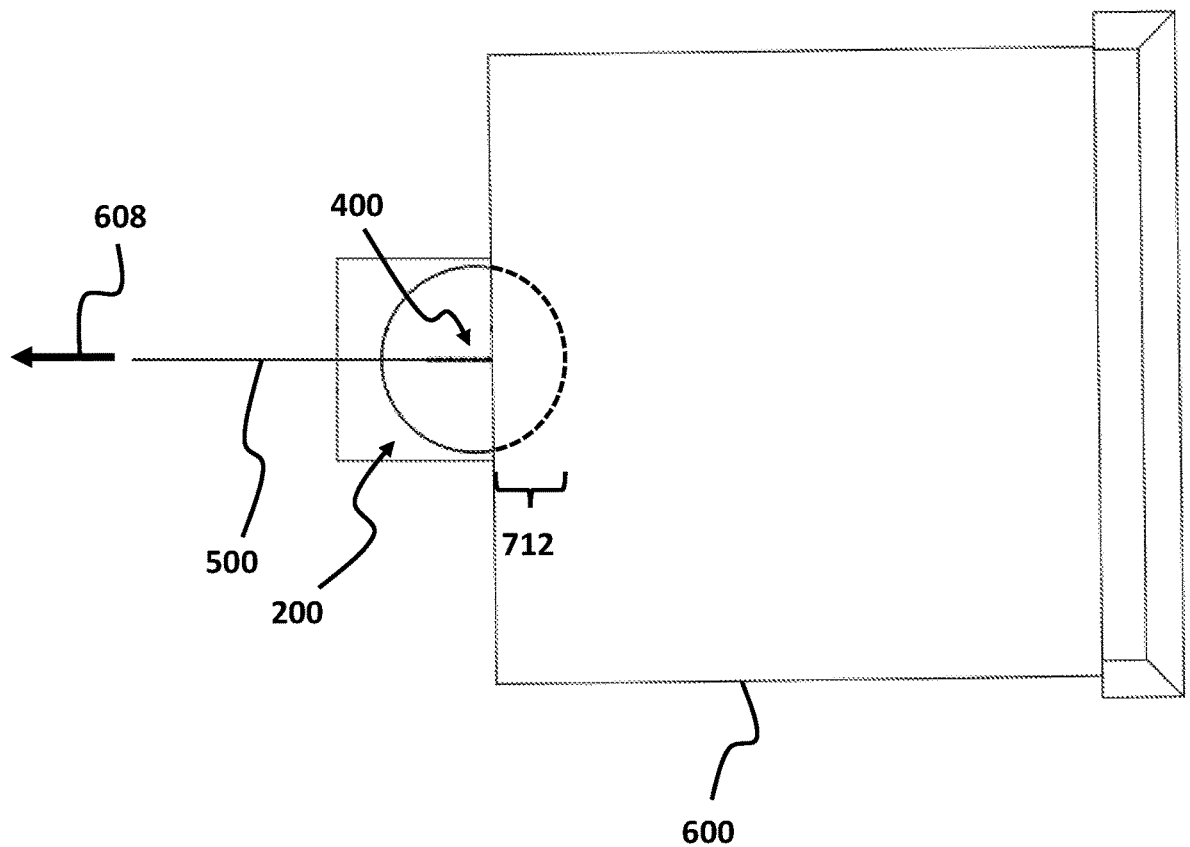
FIG. 8D illustrates a top view of a balloon in a second scenario in which a second part of a balloon is covered by a blanket, consistent with one or more exemplary embodiments of the present disclosure.

FIG. 8A shows a perspective view of balloon 200 in a second scenario in which a second part 712 of balloon 200 is covered by blanket 600, consistent with one or more exemplary embodiments of the present disclosure. FIG. 8B shows a side view of balloon 200 in a second scenario in which second part 712 of balloon 200 is covered by blanket 600, consistent with one or more exemplary embodiments of the present disclosure. FIG. 8C shows another side view of balloon 200 in a second scenario in which second part 712 of balloon 200 is covered by blanket 600, consistent with one or more exemplary embodiments of the present disclosure. FIG. 8D shows a top view of balloon 200 in a second scenario in which second part 712 of balloon 200 is covered by blanket 600, consistent with one or more exemplary embodiments of the present disclosure.

Figure 9A:
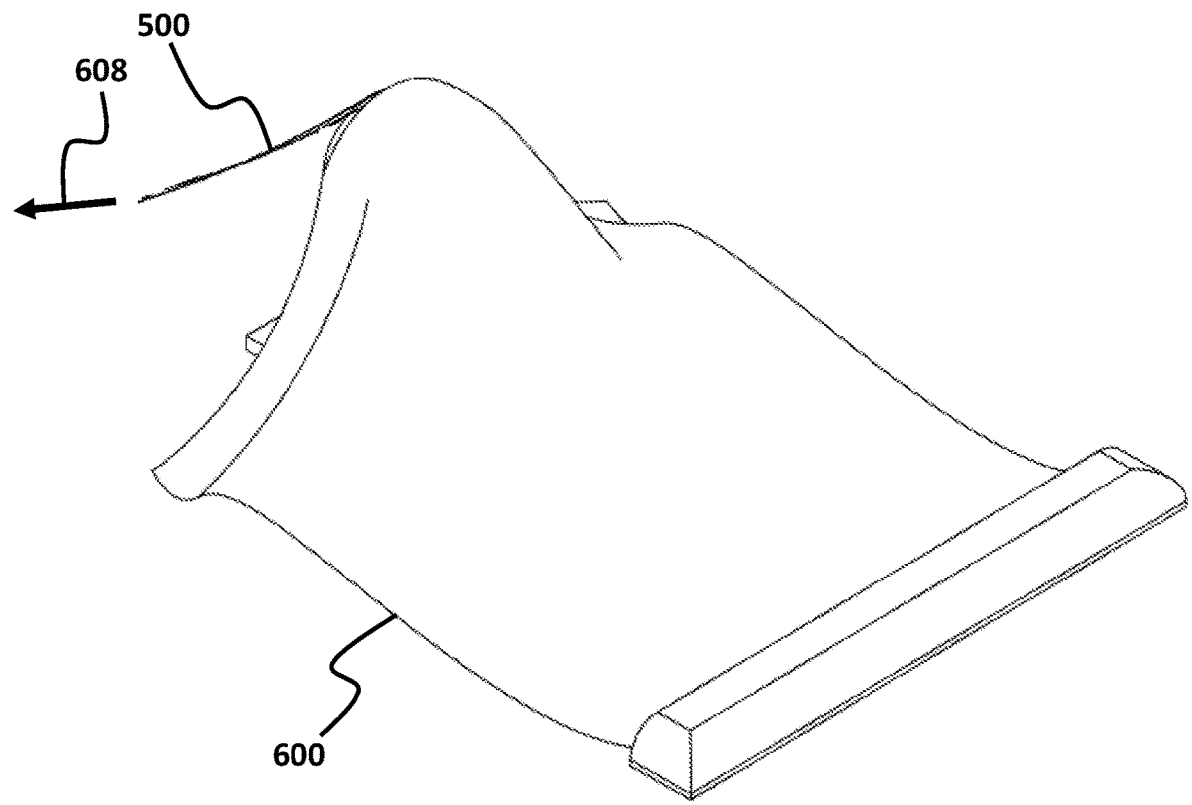
FIG. 9A illustrates a perspective view of a balloon in a third scenario in which a third part of a balloon is covered by a blanket, consistent with one or more exemplary embodiments of the present disclosure.
Figure 9B:
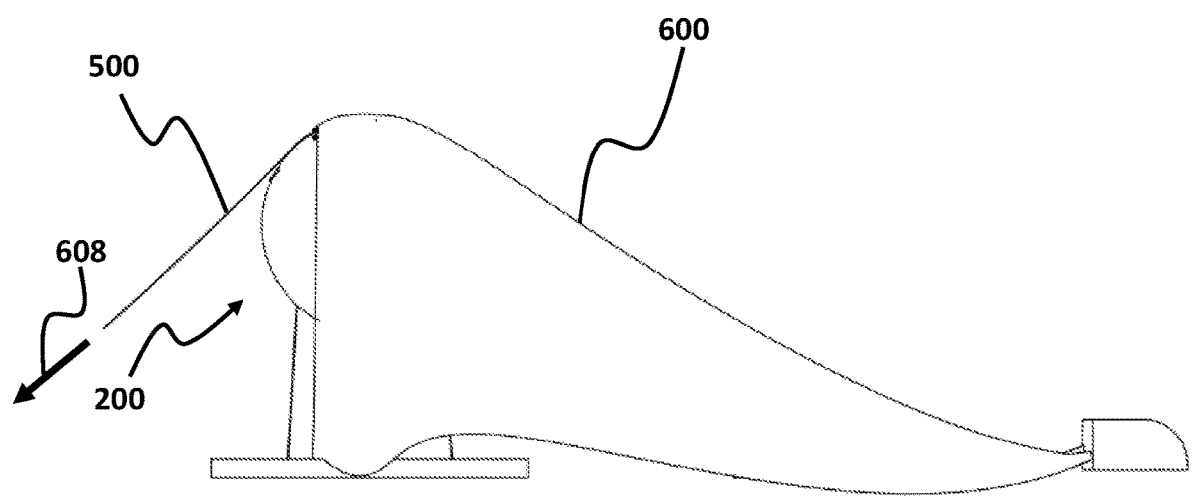
FIG. 9B illustrates a side view of a balloon in a third scenario in which a third part of a balloon is covered by a blanket, consistent with one or more exemplary embodiments of the present disclosure.
Figure 9C:
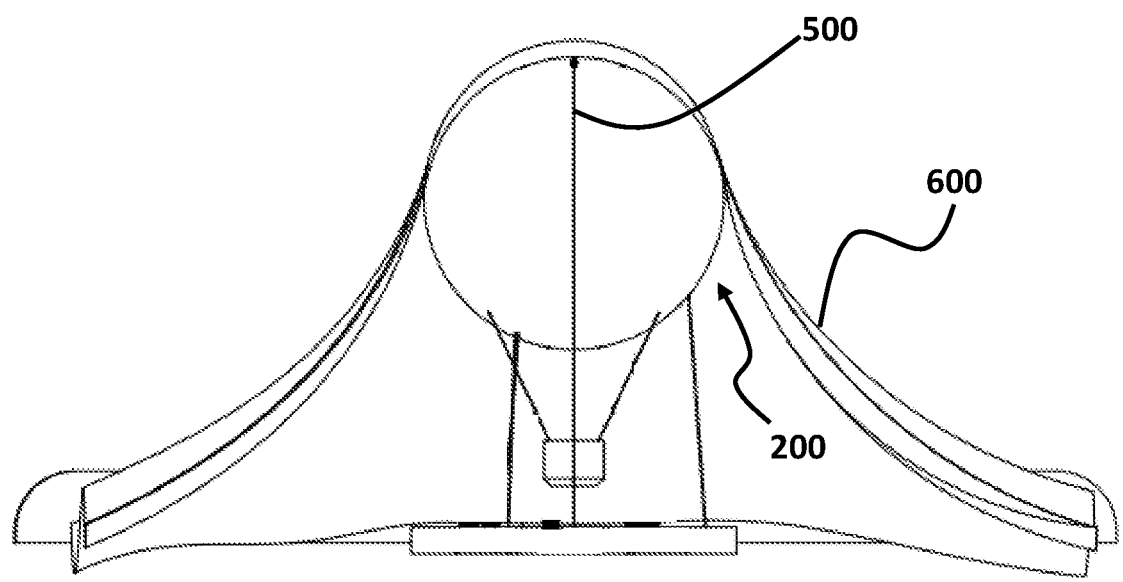
FIG. 9C illustrates another side view of a balloon in a third scenario in which a third part of a balloon is covered by a blanket, consistent with one or more exemplary embodiments of the present disclosure.
Figure 9D:
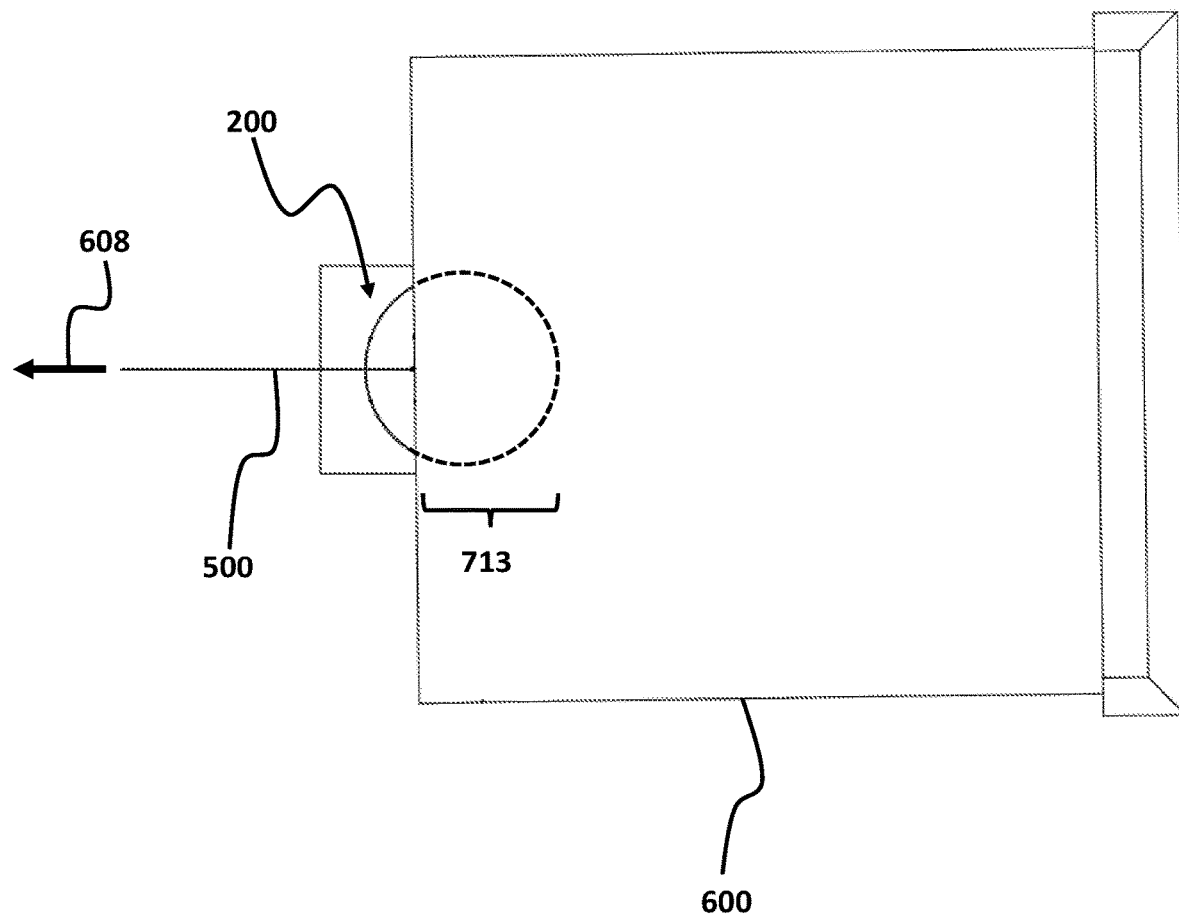
FIG. 9D illustrates a top view of a balloon in a third scenario in which a third part of a balloon is covered by a blanket, consistent with one or more exemplary embodiments of the present disclosure.

FIG. 9A shows a perspective view of balloon 200 in a third scenario in which a third part 713 of balloon 200 is covered by blanket 600, consistent with one or more exemplary embodiments of the present disclosure. FIG. 9B shows a side view of balloon 200 in a third scenario in which third part 713 of balloon 200 is covered by blanket 600, consistent with one or more exemplary embodiments of the present disclosure. FIG. 9C shows another side view of balloon 200 in a third scenario in which third part 713 of balloon 200 is covered by blanket 600, consistent with one or more exemplary embodiments of the present disclosure. FIG. 9D shows a top view of balloon 200 in a third scenario in which third part 713 of balloon 200 is covered by blanket 600, consistent with one or more exemplary embodiments of the present disclosure.

Figure 10A:
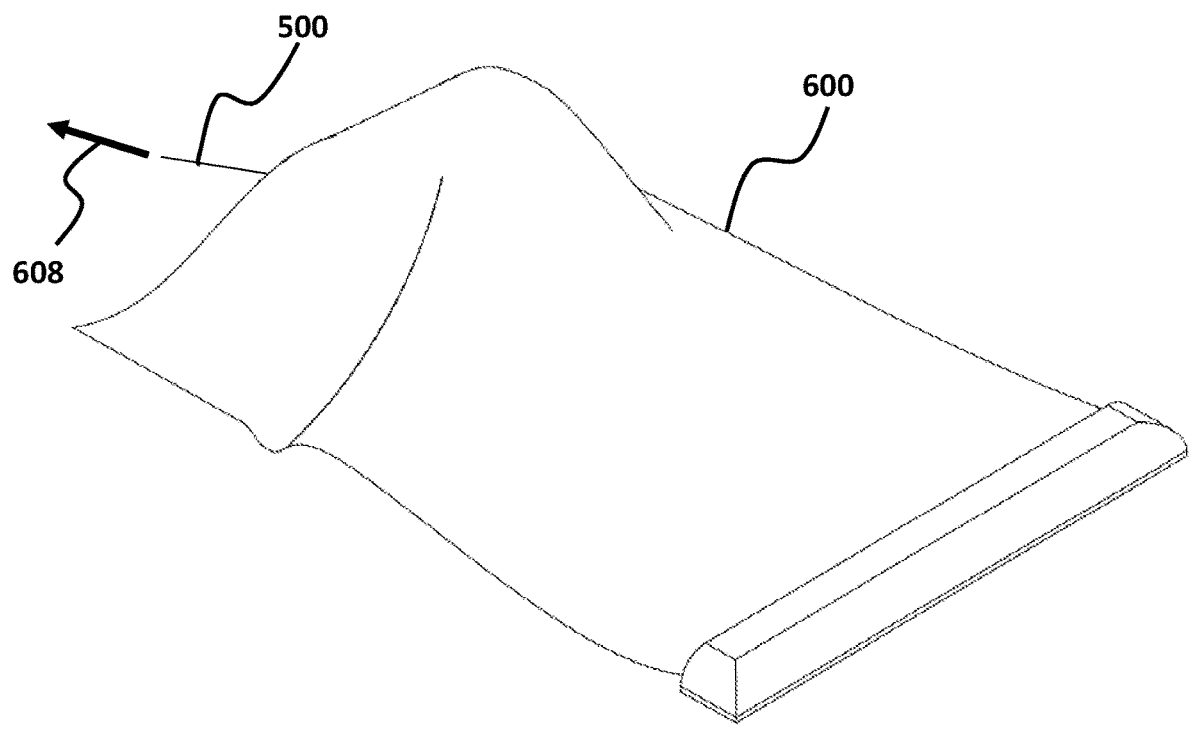
FIG. 10A illustrates a perspective view of a balloon in a fourth scenario in which whole of a balloon is covered by a blanket, consistent with one or more exemplary embodiments of the present disclosure.
Figure 10B:
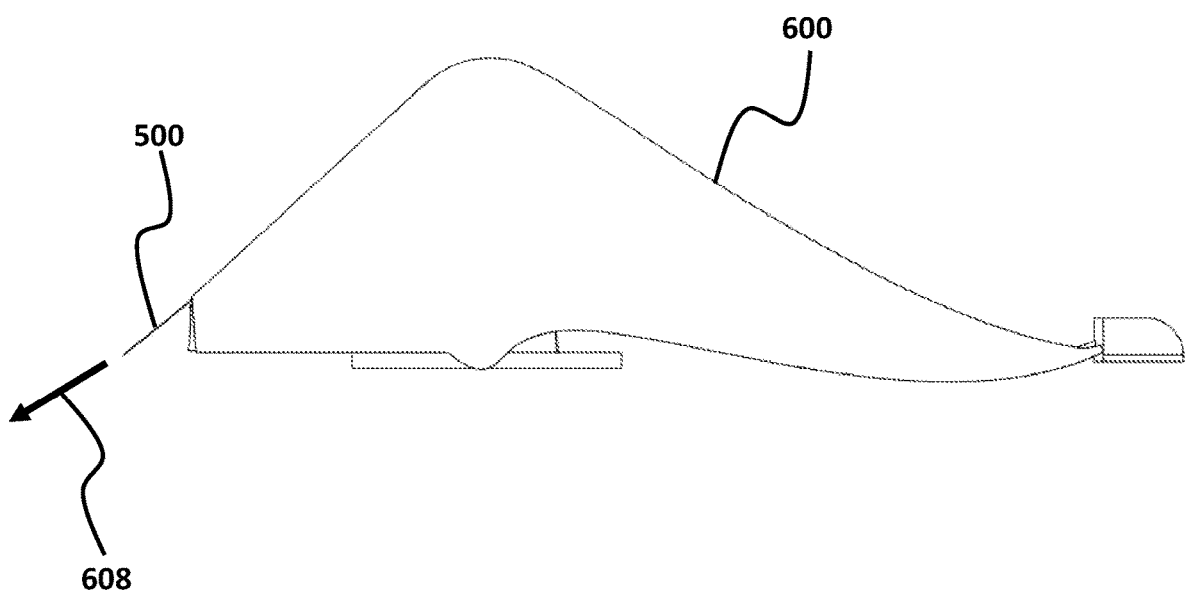
FIG. 10B illustrates a side view of a balloon in a fourth scenario in which whole of a balloon is covered by a blanket, consistent with one or more exemplary embodiments of the present disclosure.
Figure 10C:
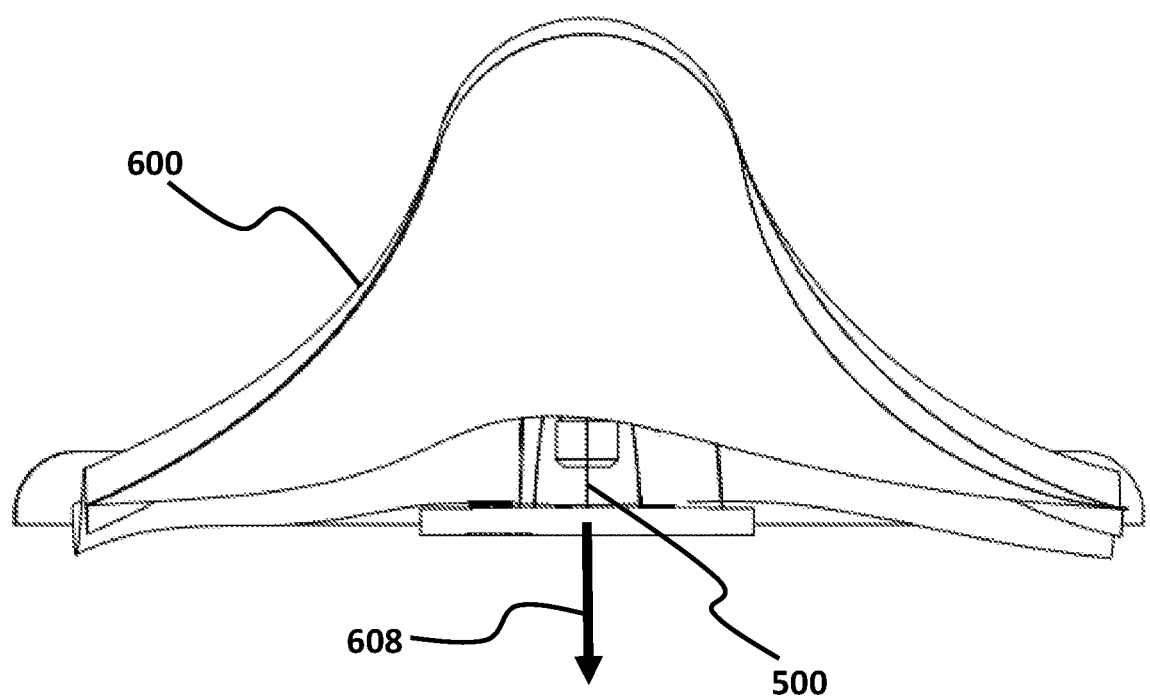
FIG. 10C illustrates another side view of a balloon in a fourth scenario in which whole of a balloon is covered by a blanket, consistent with one or more exemplary embodiments of the present disclosure.
Figure 10D:
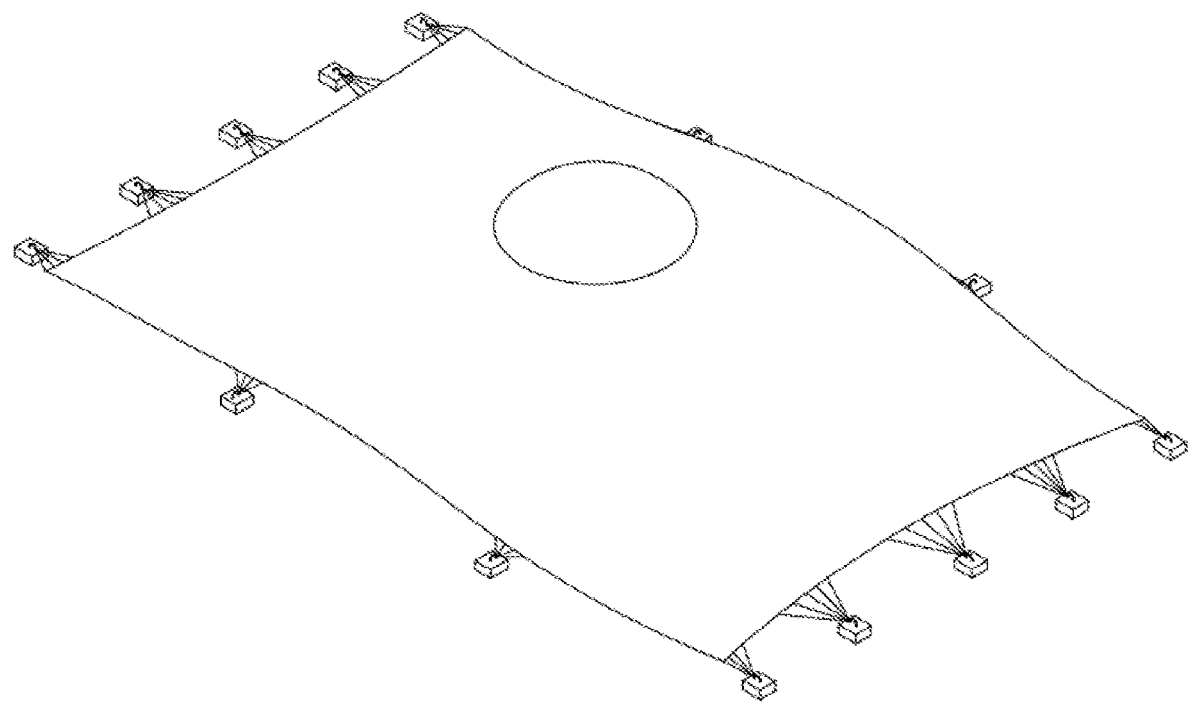
FIG. 10D illustrates a perspective view of a balloon in a fifth scenario in which whole of a balloon is covered by a blanket and the blanket is bound to the ground, consistent with one or more exemplary embodiments of the present disclosure.

FIG. 10A shows a perspective view of balloon 200 in a fourth scenario in which whole of balloon 200 is covered by blanket 600, consistent with one or more exemplary embodiments of the present disclosure. FIG. 10B shows a side view of balloon 200 in a fourth scenario in which whole of balloon 200 is covered by blanket 600, consistent with one or more exemplary embodiments of the present disclosure. FIG. 10C shows another side view of balloon 200 in a fourth scenario in which whole of balloon 200 is covered by blanket 600, consistent with one or more exemplary embodiments of the present disclosure. FIG. 10D shows a perspective view of balloon 200 in a fifth scenario in which whole of balloon 200 is covered by blanket 600 and blanket 600 is bound to the ground, consistent with one or more exemplary embodiments of the present disclosure.

Figure 11A:
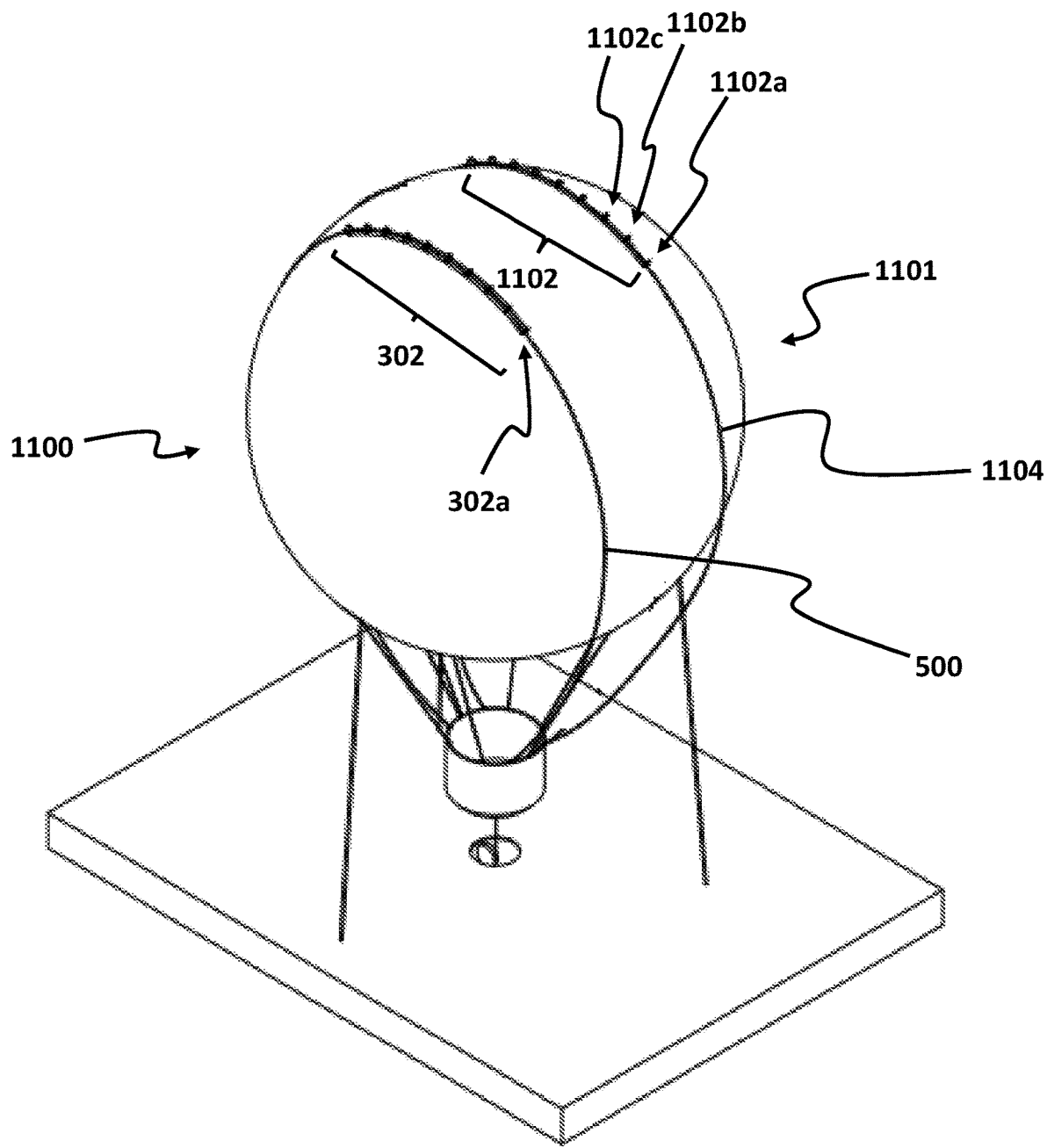
FIG. 11A illustrates a perspective view of a balloon, consistent with one or more exemplary embodiments of the present disclosure.

FIG. 11A shows a perspective view of balloon 200, consistent with one or more exemplary embodiments of the present disclosure. As shown in FIG. 11A, in an exemplary embodiment, first plurality of detachable rings 302 may be attached to a first side 1100 of balloon 200. In an exemplary embodiment, a second plurality of detachable rings 1102 may be attached to a second side 1101 of balloon 200. In an exemplary embodiment, first side 1100 and second side 1101 may refer to aspects of balloon 200 that may be visible from two horizontal perspectives. In an exemplary embodiment, second plurality of detachable rings 1102 may be similar in shape and functionality to first plurality of detachable rings 302. In an exemplary embodiment, second plurality of detachable rings 1102 may include a fourth detachable ring 1102a, a fifth detachable ring 1102b, and a sixth detachable ring 1102c. However, in an exemplary embodiment, second plurality of detachable rings 1102 may include more detachable rings in addition to fourth detachable ring 1102a, fifth detachable ring 1102b, and sixth detachable ring 1102c which are shown but not labeled in FIG. 11A. In an exemplary embodiment, first plurality of detachable rings 302 may be attached to a first lateral side of balloon 200. In an exemplary embodiment, second plurality of detachable rings 1102 may be attached to a second lateral side of balloon 200.

In an exemplary embodiment, first rope 500 may be passed through first plurality of detachable rings 302. In an exemplary embodiment, a second rope 1104 may be passed through second plurality of detachable rings 1102. In an exemplary embodiment, second rope 1104 may be similar in shape and functionality to first rope 500.

Figure 11B:
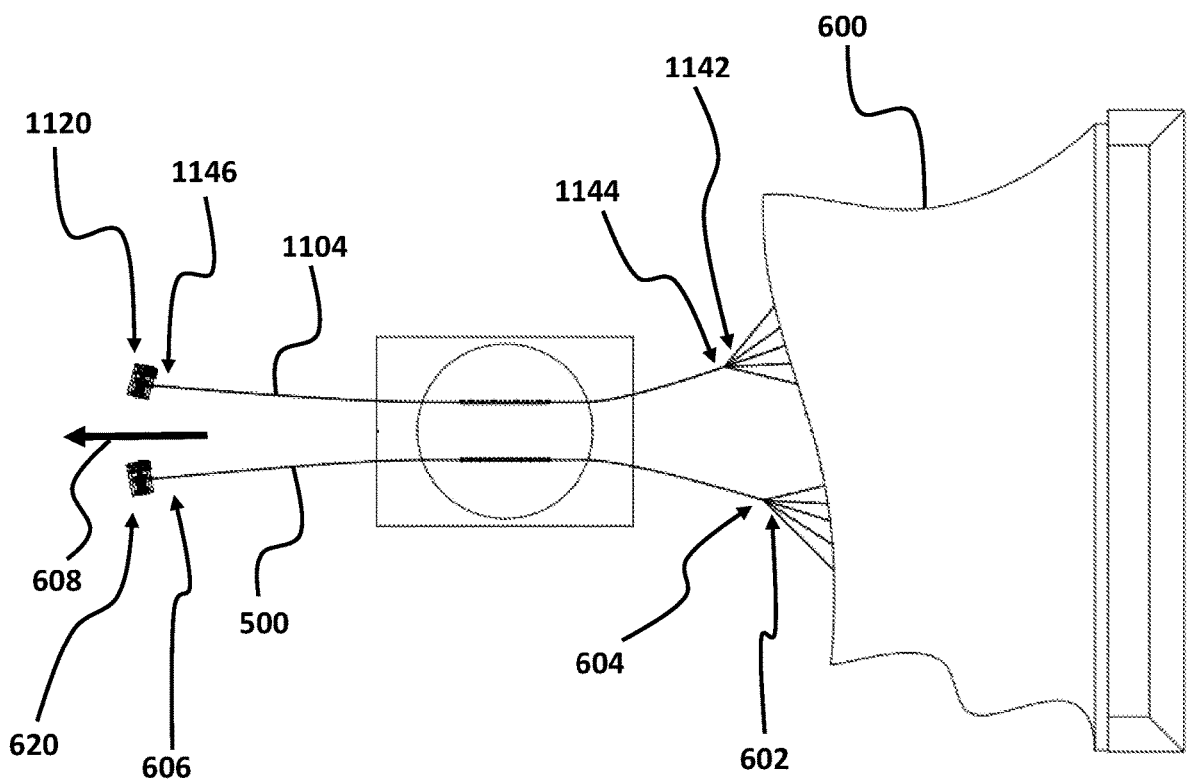
FIG. 11B illustrates a top view of a balloon, consistent with one or more exemplary embodiments of the present disclosure.

FIG. 11B shows a top view of balloon 200, consistent with one or more exemplary embodiments of the present disclosure. As shown in FIG. 11B, in an exemplary embodiment, a first end 1144 of second rope 1104 may be connected to a second point 1142 of blanket 600. In an exemplary embodiment, a second end 1146 of second rope 1104 and second end 606 of first rope 500 may simultaneously be pulled in first direction 608. In an exemplary embodiment, second end 1146 of second rope 1104 may be coupled to a second winch 1120. In an exemplary embodiment, second winch 1120 may be configured to pull second end 1146 of second rope 1104 in first direction 608. In an exemplary embodiment, it may be understood that by utilizing second plurality of detachable rings 1102 and second rope 1104 in addition to first plurality of detachable rings 302 and first rope 500, blanket 600 may cover balloon 200 more easily and more speedy.

Figure 11C:
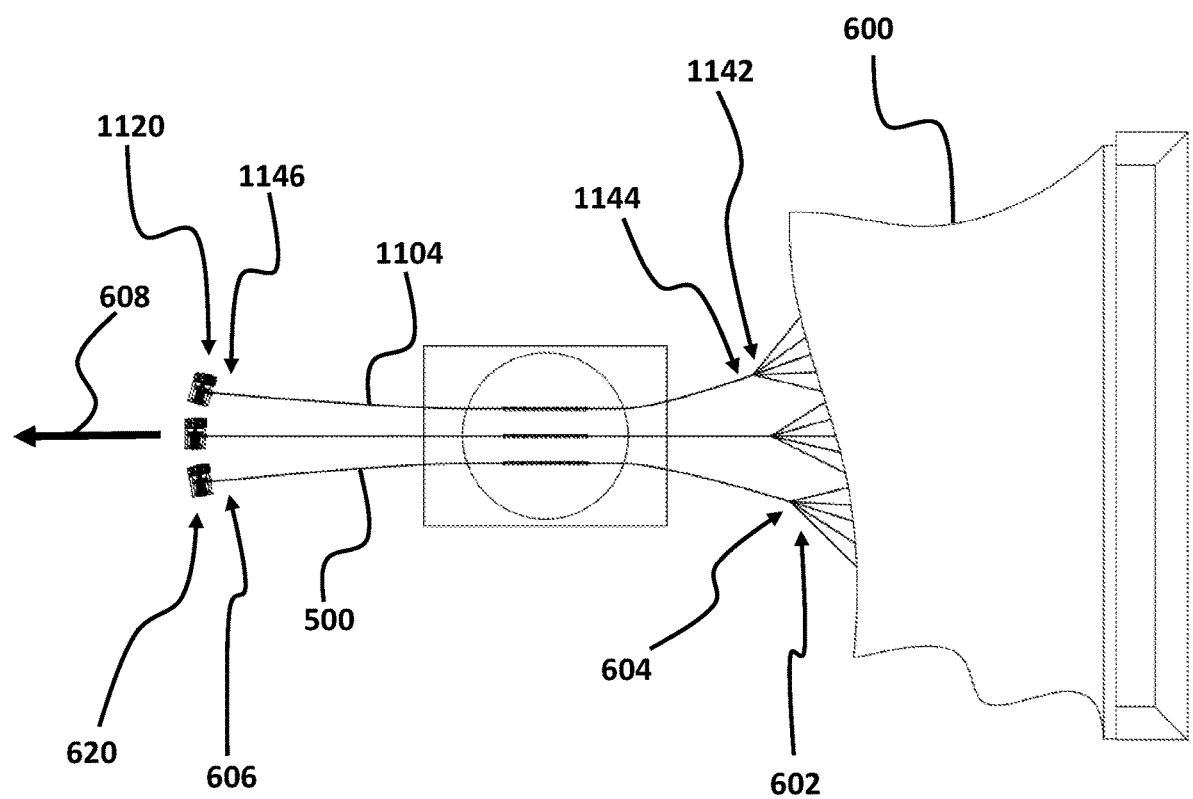
FIG. 11C illustrates a top view of a balloon, consistent with one or more exemplary embodiments of the present disclosure.

In an exemplary embodiment, more plurality of detachable rings may be attached to balloon 200. In an exemplary embodiment, utilizing more plurality of detachable rings in addition to first plurality of detachable rings 302 and second plurality of detachable rings 1102, may help in utilizing blanket 600 to cover balloon 200 more easily and more speedily. For example, a third plurality of detachable rings may be attached to balloon 200. FIG. 11C shows a top view of balloon 200, consistent with one or more exemplary embodiments of the present disclosure.

FIG. 12A shows a perspective view of a blimp 1200, consistent with one or more exemplary embodiments of the present disclosure. In an exemplary embodiment, method 100 may also be used to shelter a blimp such as blimp 1200. As shown in FIG. 12A, in an exemplary embodiment, method 100 may be implemented when blimp 1200 is in a moored position.

FIG. 12B shows a perspective view of blimp 1200 in a scenario in which first end 604 of a first rope 500 is connected to first point 602 of blanket 600 and first end 1144 of second rope 1104 is connected to second point 1142 of blanket 600, consistent with one or more exemplary embodiments of the present disclosure. FIG. 12C shows a perspective view of blimp 1200 in a first scenario in which a first part 711 of blimp 1200 is covered by blanket 600, consistent with one or more exemplary embodiments of the present disclosure. FIG. 12D shows a perspective view of blimp 1200 in a second scenario in which a second part of blimp 1200 is covered by blanket 600, consistent with one or more exemplary embodiments of the present disclosure. FIG. 12E shows a perspective view of blimp 1200 in a third scenario in which a third part of blimp 1200 is covered by blanket 600, consistent with one or more exemplary embodiments of the present disclosure. FIG. 12F shows a perspective view of blimp 1200 in a fourth scenario in which whole of blimp 1200 is covered by blanket 600, consistent with one or more exemplary embodiments of the present disclosure. FIG. 12G shows a perspective view of blimp 1200 in a fifth scenario in which whole of blimp 1200 is covered by blanket 600 and blanket 600 is bound to the ground, consistent with one or more exemplary embodiments of the present disclosure.

In an exemplary embodiment, each of a first end 13052 of third rope 1305 and a first end of fourth rope may be connected to a respective winch. In an exemplary embodiment, these respective winches may be configured to pull third rope 1305 and the fourth rope in a second direction 1304. In an exemplary embodiment, in order to remove blanket 600, third rope 1305 and the fourth rope may be pulled in second direction 1304 utilizing the respective winches. In an exemplary embodiments, it may be understood that when method 100 is utilized to shelter balloon 200, in order to remove blanket 600, third rope 1305 and the fourth rope may be pulled in second direction utilizing the respective winches.

FIG. 13 shows a side view of blimp 1200, consistent with one or more exemplary embodiments of the present disclosure. As shown in FIG. 13, in an exemplary embodiment, first end 13052 of third rope 1305 may be connected to a third winch 1302. In an exemplary embodiment, third winch 1302 may be configured to pull third rope 1305 in a second direction 1304. In an exemplary embodiment, it may be understood that, third winch 1302 may be configured to work independently from first winch 620 and second winch 1120. In an exemplary embodiment, first winch 620 and second winch 1120 may be utilized to shelter a balloon, a blimp, an airship, or a tethered balloon with a blanket and third winch 1302 may be utilized to remove a blanket from a top surface of a balloon, a blimp, an airship, or a tethered balloon.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective spaces of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for sheltering a balloon, the method comprising:
    obtaining a first guideway by detachably attaching a first plurality of detachable rings to a first side of an outer surface of the balloon, comprising:
        attaching a bottom side of a first strip to the first side of the outer surface of the balloon; and
        detachably attaching the first plurality of detachable rings to a top side of the first strip by attaching the first plurality of detachable rings to the top side of the first strip by utilizing an adhesive substance, comprising:
            attaching a first self-adhesive woven polyester to the top side of the first strip; and
            attaching the first plurality of detachable rings to the first self-adhesive woven polyester;
    obtaining a second guideway by detachably attaching a second plurality of detachable rings to a second side of the outer surface of the balloon, comprising:
        attaching a bottom side of a second strip to the second side of the outer surface of the balloon; and
        detachably attaching the second plurality of detachable rings to a top side of the second strip attaching the second plurality of detachable rings to the top side of the second strip by utilizing the adhesive substance, comprising:
            attaching a second self-adhesive woven polyester to the top side of the first strip; and
            attaching the second plurality of detachable rings to the second self-adhesive woven polyester;
    placing a first rope into the first guideway by passing the first rope through the first plurality of detachable rings;
    placing a second rope into the second guideway by passing the second rope through the second plurality of detachable rings;
    attaching a first end of the first rope to a first point of a blanket;
    attaching a first end of the second rope to a second point of the blanket; and
    pulling the blanket over the balloon, comprising:
        guiding the first point of the blanket to move along the first guideway by pulling a second end of the first rope in a first direction, comprising:
            coupling the second end of the first rope to a first winch; and
            pulling the second end of the first rope in the first direction utilizing the first winch;
        guiding the second point of the blanket to move along the second guideway by pulling the second end of the second rope in the first direction, comprising:
            coupling the second end of the second rope to a second winch; and
            pulling the second end of the second rope in the first direction utilizing the second winch;
        detaching each respective detachable ring of the first plurality of detachable rings from the first side of the outer surface of the balloon responsive to the first point of the blanket hitting each respective detachable ring of the first plurality of detachable rings; and
        detaching each respective detachable ring of the second plurality of detachable rings from the second side of the outer surface of the balloon responsive to the second point of the blanket hitting each respective detachable ring of the second plurality of detachable rings.

2. A method for sheltering a balloon, the method comprising:
obtaining a first guideway by detachably attaching a first plurality of detachable rings to a first side of an outer surface of the balloon;
placing a first rope into the first guideway by passing the first rope through the first plurality of detachable rings;
attaching a first end of the first rope to a first point of a blanket; and
pulling the blanket over the balloon by pulling a second end of the first rope in a first direction.

3. The method of claim 2, wherein pulling the blanket over the balloon comprises:
guiding the first point of the blanket to move along the first guideway by pulling the second end of the first rope in a first direction; and
detaching each respective detachable ring of the first plurality of detachable rings from the first side of the outer surface of the balloon responsive to the first point of the blanket hitting each respective detachable ring of the first plurality of detachable rings.

4. The method of claim 3, wherein obtaining the first guideway comprises:
attaching a bottom side of a first strip to the first side of the outer surface of the balloon; and
detachably attaching the first plurality of detachable rings to a top side of the first strip.

5. The method of claim 4, wherein detachably attaching the first plurality of detachable rings to the top side of the first strip comprises attaching the first plurality of detachable rings to the top side of the first strip by utilizing an adhesive sub stance.

6. The method of claim 5, wherein pulling the second end of the first rope in the first direction comprises:
coupling the second end of the first rope to a first winch; and
pulling the second end of the first rope in the first direction utilizing the first winch.

7. The method of claim 6, wherein detachably attaching the first plurality of detachable rings to the top side of the first strip comprises:
attaching a first self-adhesive woven polyester to the top side of the first strip; and
attaching the first plurality of detachable rings to the first self-adhesive woven polyester.

8. The method of claim 7, further comprising:
obtaining a second guideway by detachably attaching a second plurality of detachable rings to a second side of the outer surface of the balloon;
placing a second rope into the second guideway by passing the second rope through the second plurality of detachable rings;
attaching a first end of the second rope to a second point of the blanket;
pulling the blanket over the balloon by simultaneously pulling a second end of the second rope in the first direction and pulling the second end of the first rope in the first direction.

9. The method of claim 8, wherein pulling the blanket over the balloon further comprises:
guiding the second point of the blanket to move along the second guideway by pulling the second end of the second rope in the first direction; and
detaching each respective detachable ring of the second plurality of detachable rings from the second side of the outer surface of the balloon responsive to the second point of the blanket hitting each respective detachable ring of the second plurality of detachable rings.

10. The method of claim 9, wherein obtaining the second guideway comprises:
attaching a bottom side of a second strip to the second side of the outer surface of the balloon; and
detachably attaching the second plurality of detachable rings to a top side of the second strip.

11. The method of claim 10, wherein detachably attaching the second plurality of detachable rings to the top side of the second strip comprises attaching the second plurality of detachable rings to the top side of the second strip by utilizing the adhesive substance.

12. The method of claim 11, wherein pulling the second end of the second rope in the first direction comprises:
coupling the second end of the second rope to a second winch; and
pulling the second end of the second rope in the first direction utilizing the second winch.

13. The method of claim 12, wherein detachably attaching the second plurality of detachable rings to the top side of the second strip comprises:
attaching a second self-adhesive woven polyester to the top side of the first strip; and
attaching the second plurality of detachable rings to the second self-adhesive woven polyester.

\* \* \* \* \*